(12) United States Patent
Depape et al.

(10) Patent No.: US 9,495,879 B2
(45) Date of Patent: Nov. 15, 2016

(54) SYSTEMS AND METHODS FOR PROVIDING OPTIMIZED TAXIING PATH OPERATION FOR AN AIRCRAFT

(71) Applicant: AIRBUS OPERATIONS SAS, Toulouse (FR)

(72) Inventors: Pierre Depape, Paulhac (FR); Pierre Scacchi, Toulouse (FR); Pascale Louise, Toulouse (FR); Francois Bounaix, Tournefeuille (FR); Thomas Stanislawiak, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/565,964

(22) Filed: Dec. 10, 2014

(65) Prior Publication Data

US 2016/0171899 A1 Jun. 16, 2016

(51) Int. Cl.
| | |
|---|---|
| *G01C 21/36* | (2006.01) |
| *G01C 21/28* | (2006.01) |
| *G08G 5/00* | (2006.01) |
| *G08G 5/06* | (2006.01) |

(52) U.S. Cl.
CPC ............... *G08G 5/065* (2013.01); *G01C 21/28* (2013.01); *G01C 21/3626* (2013.01); *G01C 21/3667* (2013.01); *G08G 5/0013* (2013.01); *G08G 5/0021* (2013.01)

(58) Field of Classification Search
CPC .. G08G 5/065; G08G 5/0013; G08G 5/0021; G01C 21/3667; G01C 21/3626; G01C 21/28

USPC .......................................................... 701/120
See application file for complete search history.

(56) References Cited

U.S. PATENT DOCUMENTS

| | | | | |
|---|---|---|---|---|
| 9,202,380 | B1* | 12/2015 | Shapiro ................ | G08G 5/0082 |
| 2004/0006412 | A1* | 1/2004 | Doose .................... | G01C 21/26 |
| | | | | 701/10 |
| 2009/0018713 | A1* | 1/2009 | Coulmeau ............ | G08G 5/0013 |
| | | | | 701/3 |
| 2013/0103297 | A1* | 4/2013 | Bilek ..................... | G08G 5/065 |
| | | | | 701/120 |
| 2014/0303815 | A1* | 10/2014 | Lafon ................ | G01C 21/3446 |
| | | | | 701/3 |
| 2015/0154874 | A1* | 6/2015 | Murthy .................... | G08G 5/06 |
| | | | | 701/120 |

* cited by examiner

*Primary Examiner* — Brian P Sweeney
(74) *Attorney, Agent, or Firm* — Greer, Burns & Crain, Ltd.

(57) ABSTRACT

A taxiing path optimization system is provided for computing a taxi path of an aircraft using available taxi routes of a corresponding airport. An interaction means management unit manages interactions between a user and the taxiing path optimization system using an interactive device for inputting a taxi clearance. An aircraft positioning management unit manages positional information of the corresponding airport and aircraft received from a plurality of sources for augmenting an aircraft position by consolidating the aircraft position with the positional information in a complementary fashion. A taxi path display unit displays the taxi path based on the inputted taxi clearance and the augmented aircraft position, wherein the taxi path is automatically computed based on aircraft characteristics or airport capabilities.

9 Claims, 31 Drawing Sheets

SYSTEMS AND METHODS FOR PROVIDING OPTIMIZED TAXIING PATH OPERATION FOR AN AIRCRAFT

FIELD OF THE DISCLOSURE

The present disclosure generally relates to aircraft taxiing systems, and in particular relates to a taxiing path optimization system for an aircraft using positioning data collected from various sources.

BACKGROUND OF THE INVENTION

To assist in navigation in an airport, a process of taxiing typically includes receiving a clearance from an air traffic controller (ATC), checking the received clearance, entering the received clearance into a navigation system for displaying the clearance on a map, and building a taxi route from a current position to a destination position, for example, on a runway or at a parking gate.

In preparation for the taxiing, flight crews perform several tasks. The crews determine an accurate position of the aircraft by observing its external surroundings and/or a map. Then, the crews find and monitor a taxiing path based on the ATC clearance while monitoring an outside events and movements for preventing collision with other aircraft or equipment. Further, the crews prepare the aircraft for optimizing the taxiing path according to ATC constraints. As a result, the workloads of the flight crews become significant and convoluted during airport surface operations.

It is important that the taxiing operation is performed smoothly without any interruptions and delays. An optimization of the taxiing operation, for example, from the runway to the gate (i.e., taxi-in) and from the gate to a line-up on the runway (i.e., taxi-out), is also critical for the efficiency of the airline and airport operations. Today, certain conventional applications are provided for an effective taxiing operation, but these applications are not accurate enough and are data/time consuming.

As an example, an airport database specification developed by an Aeronautical Radio, Incorporated (ARINC), namely ARINC 816, defines an embedded interchange format for Airport Mapping Database (AMD). The ARINC 816 standard proposes a way to describe airport elements, such as taxiways, runways, parking areas, stands, buildings, roads, obstacles, and the like. Specifically, ARINC 816-0 provides geometrical descriptions with points, lines and polygons used for displaying airport maps on on-board displays. ARINC 816-2 provides additional objects, such as nodes and edges (or links between two nodes) for describing a flow graph of the airport.

Further, the ATC provides a taxi clearance to the flight crews via radio or datalink communication services. The taxi clearance includes information about a departure point, successive airport elements, and a destination point in a particular order. Specifically, the taxi clearance has a set of airport element names indicating the departure and destination points, and any elements therebetween (e.g., E60 (via) P10 P40 W30 (to) 14L, where E60 denotes the departure point, 14L denotes the destination point, and P10, P40, and W30 denote the successive elements). Based on this taxi clearance, a taxi route is entered into an on-board avionics system using a keyboard, a datalink, or other suitable electronic devices (e.g., a color-coded electronic chart developed by Jeppesen®). The taxi route represents an on-ground trajectory of the airport, including a set of identifiers or a set of point coordinates, continuously connecting two extremities (e.g., the departure and destination points).

In the aircraft, an ownship position is determined by various sensors, such as an Inertial Reference System (IRS) or a Global Navigation Satellite System (GNSS), or some radio navigation devices (VHF Omnidirectional Range, Distance Measuring Equipment) or any combination of above-mentioned systems and devices. The ownship position is typically displayed on the on-board avionics system for navigation purposes, and provides a map which represents the aircraft surroundings within a predetermined range. To generate the taxi route, the flight crew receives the taxi clearance and writes it on a piece of paper. Next, the crew uses an airport paper map to find the taxi route to follow.

Alternatively, the crew uses the Jeppesen® chart to highlight a path on a digital map as if the crew draws the path with a pen, but the pilot must enter the clearance into the system using the keyboard or other suitable tactile interactive devices for computing the corresponding taxi route on the digital map for display. This manual process of entering the sequence is slow and cumbersome because the clearance needs to be continuous (i.e., each clearance element must be connected to a successive one). For example, if the taxi clearance sequence is long, ensuring the continuity of the clearance sequence takes time when using the keyboard. Further, aircraft characteristics, such as its Aircraft Classification Number (ACN), maximum limitations concerning its wingspan, and its Pavement Classification Number (PCN) are not included in computing the taxi route.

Generally, the flow graph of the airport is described through the nodes and edges, which are tightly integrated with other geometrical objects. For example, the nodes and edges are attached to containers, which contain objects related to a given element. A runway container contains a runway surface geometry, a runway center line geometry, runway thresholds, runway markings, nodes and edges related to this particular runway, and the like. Thus, the flow graph of the airport includes unnecessary geometrical descriptions of the airport, causing memory space waste, longer computation time, and redundant complexity for generating the taxi route. Further, because this type of flow graph does not include an explicit connectivity of each edge, the associated application must determine to which set of edges a given edge is connected, thereby causing additional computation time. Typically, this type of flow graph only includes taxiways and runways, and does not have parking apron and deicing areas, making it impossible to compute the taxi route from or to a gate or a parking stand.

Another disadvantage of the conventional application is that when a system of visualization of the taxi clearance is available in the cockpit via the avionics system or an Electronic Flight Bag (EFB) system, the flight crews often must use a piece of paper to write down the clearance before entering the clearance into the system, and explicitly advise the avionics system that the pilot will manually enter the clearance. Modern tactile tablets, such as iPad® or laptops with a touch-sensitive screen, can support the EFB system for managing documents, aircraft libraries, manuals, and the like. However, the drawback of Component On-The-Shelf (COTS) tablets is that a GNSS position provided by the tablets does not satisfy mandated accuracy required in the aviation rules and regulations, such as a general acceptable means of compliance for airworthiness of products, parts and appliances, namely AMC 20-25.

All these steps take additional time and increase workload during the taxiing operation while the pilot simultaneously performs other tasks, such as checking and controlling the aircraft, communicating with ground personnel, performing surveillance tasks, and the like. These additional tasks can be a source of potential errors, and may require significant time and effort to correct mistakes while listening to ATC instructions, thereby increasing operation costs. Therefore, there is a need for developing an improved taxiing system and method such that the taxiing system facilitates an accurate guidance of the aircraft for reliable on-ground navigation and control, using a standardized airport database.

SUMMARY OF THE INVENTION

Advantages are achieved by the present taxiing path optimization system which includes an improved Airport Graph Database (AGDB) for storing specific information relating to geographic and geometric relationships between an aircraft and its surrounding objects in a two or three dimensional coordinate system. The present taxiing path optimization system further includes a computer processor coupled to databases and programmed to perform tasks and display positional information of airport elements and paths. Included in the present AGDB is a description of an airport flow graph, and is designed to take up minimal space in memory such that it can be readily embedded in different applications, such as avionics systems in an aircraft.

For example, positional information representing parking stands, deicing areas, landscape, buildings, airports, runways, taxiways, terminal gates, obstacles, approach profiles, flight paths, and the like is collected or compiled from various sources, such as satellites, internet applications, and airport databases. Such information is stored in either onsite or remote databases, and as described in greater detail below, various functions can be performed for flight crew members on board by displaying reliable, real time accurate data. It is preferred that the present AGDB is self-sufficient with such information, and does not rely on other databases. Further, the present AGDB can be used with other on-board and on-ground applications, such as the ATC systems for displaying airport elements, or generating taxi clearances or routes.

As discussed in greater detail below, the present taxing path optimization system provides an enhanced support function for taxiing operations with an optimized dynamic behavior of the taxi path update using various positioning sources and augmented algorithm techniques. In a preferred embodiment, it is contemplated that a system and method is provided for processing multiple sources of data for positioning of the aircraft using at least one of an internal or external GNSS sensor, a geometric layout data system, an Automatic dependent surveillance-broadcast (ADS-B), a wireless technology (e.g., Wifi), and the like.

Also included in the present taxiing path optimization system is that a system and method configured for correlating various sources of positioning data with the geometric topology of an airport layout. Further, the present taxing path optimization system provides enhanced displays and updates of the taxi path based on GNSS positions related to the airport elements and the aircraft in real time.

The present taxing path optimization system automatically generates the taxi route for the aircraft based on the positional information. As a result, a stable and efficient taxi route is maintained during taxiing, and a reliable on-ground navigation is provided while the aircraft is moving on a runway or taxiway, or when the aircraft is in a standby mode at a terminal gate or on the runway or taxiway. Thus, the present taxing path optimization system provides a reliable means of assisting in the operation of the aircraft during on-ground taxing or while being parked at the terminal gate or other locations at the airport.

Other advantages of the present taxing path optimization system include, as described in greater detail below, a pre-computed connectivity of each link and a pre-computed dual relationship between points and nodes, curves and links, and links and airport elements. Because the present optimization system enables the flight crew member to quickly enter a taxi clearance during a taxi phase, the operation time, costs, and workload are reduced significantly. Since the taxi clearance input does not have to be complete or continuous, and the present optimization system automatically constructs the taxi clearance by filling in potential gaps, the crew can quickly select the taxi clearance by entering only a portion of the entire taxi clearance. For example, entering only the departure and destination elements suffices, and intermediate clearance elements between the departure and destination elements are automatically generated by the present optimization system. As a result, the next element entered in the taxi clearance does not need to be contiguous to the previous element because the present optimization system automatically fills in the elements between adjacent elements.

In one embodiment, a taxiing path optimization system is provided for computing a taxi path of an aircraft using available taxi routes of a corresponding airport. An interaction means management unit manages interactions between a user and the taxiing path optimization system using an interactive device for inputting a taxi clearance. An aircraft positioning management unit manages positional information of the corresponding airport and aircraft received from a plurality of sources for augmenting an aircraft position by consolidating the aircraft position with the positional information in a complementary fashion. A taxi path display unit displays the taxi path based on the inputted taxi clearance and the augmented aircraft position, wherein the taxi path is automatically computed based on aircraft characteristics or airport capabilities.

In another embodiment, a method of computing a taxi route for an aircraft is provided. The taxi route represents an on-ground trajectory of an airport during taxiing operations utilizing a taxiing path optimization system. Included in the method are building a display-independent and geometrically-based database for describing a flow graph of the airport, the database representing a description of all potential taxi ground trajectories for the aircraft; receiving an initial taxi clearance having airport elements, the taxi clearance being inputted by a user or a related system based on information stored in the database; modifying the initial taxi clearance by eliminating ambiguous taxi routes caused by the initial taxi clearance, and by resolving gaps between the airport elements in the initial taxi clearance; and finalizing the taxi route based on the modified taxi clearance for on-ground navigation of the aircraft at the airport.

In yet another embodiment, a method of computing a taxi route for an aircraft is provided. The taxi route represents an on-ground trajectory of an airport during taxiing operations utilizing a taxiing path optimization system. Included in the method are receiving an initial taxi clearance having a list of taxi clearance elements including at least two airport elements; searching for links between successive pairs of nodes defined by the list of taxi clearance elements using a predetermined algorithm; generating a set of links connecting the nodes based on the searched links; automatically generating at least one airport element for filling in gaps between unconnected airport elements; consolidating the initial taxi clearance with the generated airport elements;

and discretizing the set of links into X/Y points as a final taxi route representation for the aircraft.

The foregoing and other aspects and features of the disclosure will become apparent to those of reasonable skill in the art from the following detailed description, as considered in conjunction with the accompanying drawings.

DETAILED DESCRIPTION OF THE PREFERRED EMBODIMENTS

Preferred embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Figure 1:
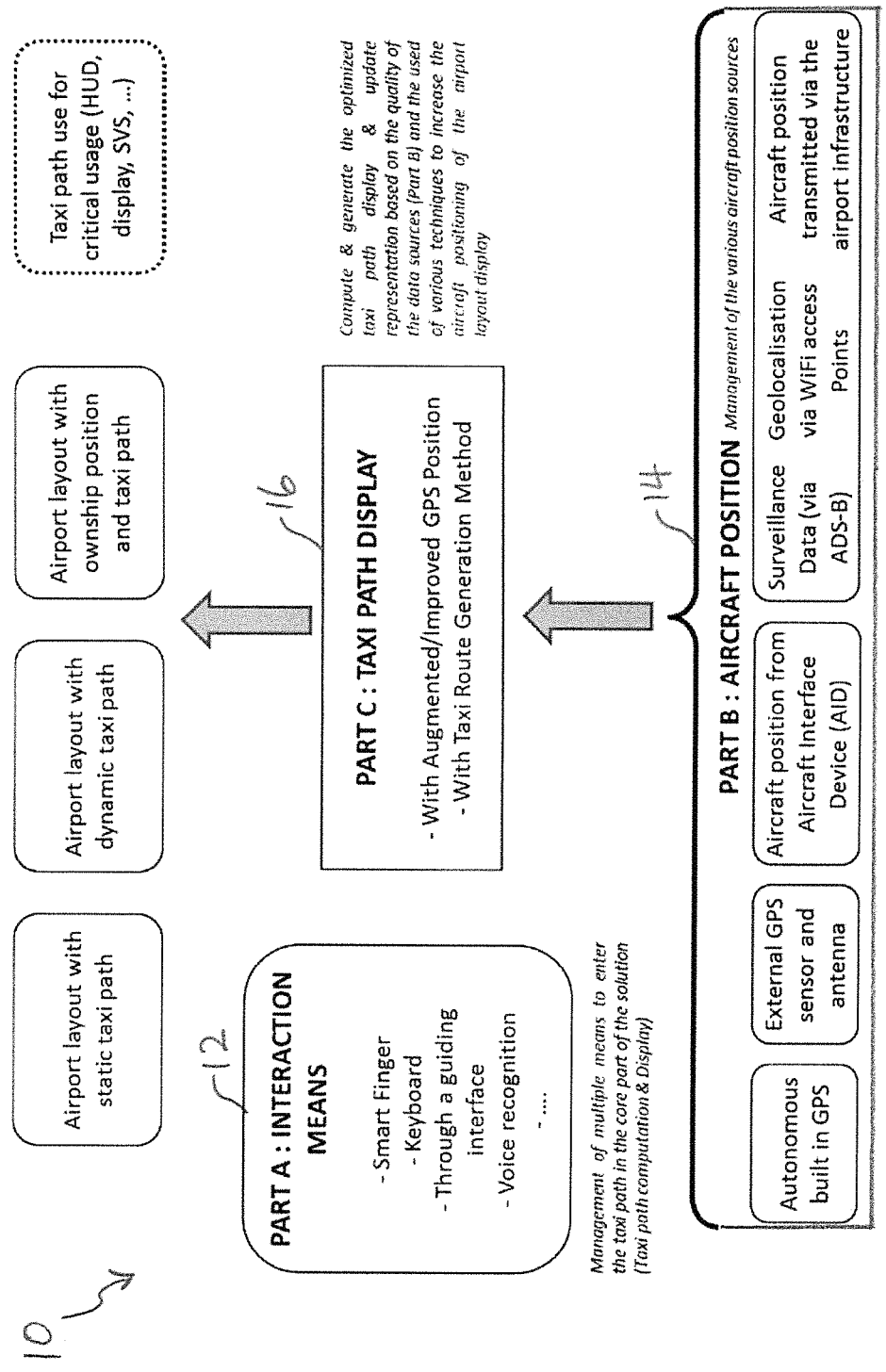
FIG. 1 illustrates an exemplary visualization of the present taxiing path optimization system.

Referring now to FIG. 1, the present taxiing path optimization system is generally designated 10, and is designed to provide an efficient way to compute an aircraft taxi path using a display of taxi routes on top of various airport layouts. In one embodiment, the taxi path is displayed on an electronic chart of the airport. In another embodiment, the taxi path is displayed on an airport map compatible with industry requirements for airport mapping databases for aeronautical use (e.g., ED 99C) and the ARINC 816-0 standard established by Radio Technical Commission for Aeronautics (RTCA). In yet another embodiment, the taxi path is displayed on a conformal display for guidance purposes, for example, in a Head-up Display (HUD) or a Synthetic Vision System (SVS). As a result, the present taxiing path optimization system 10 provides a scalable way to manage the taxiing operations with various options to suit different applications.

Included in the present system 10 are an interaction means management system or unit 12 (Part A), an aircraft positioning management system or unit 14 (Part B), and a taxi path display system or unit 16 (Part C). The interaction means management system 12 manages interactions between flight crew members and the present system 10 by way of a human machine interface (HMI), such as a keyboard, a touch sensitive pad or screen, a voice recognition system, and the like.

As discussed above, when the flight crew receives the taxi clearance from the ATC, the crew manually computes the taxi path at the beginning of the taxiing and during an execution of a taxing phase, such as taxi-out and taxi-in. The term "taxi-out" generally refers to aircraft navigation from any parking stand until a line-up on a runway. The term "taxi-in" generally refers to the aircraft navigation from the runway to an arrival at a parking site or a designated gate.

In Air Traffic Management (ATM), certain airports are equipped with routing functions for allowing a routing computation of the taxi path in advance (e.g., before the push back and before landing). This preplanned taxi path can be sent directly from the airport to the aircraft if the datalink (or the datalink communication service) is available, and also via an airline flight operation if there is a sharing of the routing data information among the airport stakeholders (e.g., an airport or airlines).

Included in the interaction means management system 12 are interactive (e.g., textual and graphical) devices configured for receiving an input signal from the crew. In one embodiment, the crew uses his or her own finger, namely a "Smart Finger" system, to graphically interact with the present system 10. Optionally, the crew outspokenly states the taxi path into a vocal recognition system. It is also contemplated that an eye tracking mechanism is provided for allowing the present system 10 to display the taxi path based on eye movement correlated with a layout of the airport.

The interaction means management system 12 takes advantage of the datalink capabilities to automatically receive the taxi clearance from the ATC if the airport is equipped with the datalink. The taxi clearance is generally received in a dedicated Communication Management Unit (CMU) and then transferred to a tablet via an Aircraft Interface Device (AID). A dedicated airline datalink can be used for the airline flight operations. A collaborative airport database reachable by the aircraft can also be used for a routing service in exchange of the preplanned route.

The aircraft positioning management system 14 manages GNSS information received from multiple sources using the tablet or via aircraft interfaces. The GNSS information can be received from at least one of a built-in GNSS positioning system of the tablet, an external GNSS sensor connected to the tablet to increase accuracy, and an internal aircraft GNSS positioning system via the AID. Each GNSS source operates in a complementary fashion to provide accurate positional information of the aircraft during taxiing operations.

Specifically, the aircraft positioning management system 14 is designed to interface with other data sources for augmenting the accuracy and integrity of the aircraft position. In one embodiment, the aircraft positioning management system 14 utilizes an Automatic Dependence Surveillance Broadcast Data (ADS-B IN). While the ADS-B IN data is used to display the surrounding traffic on a graphical display, the aircraft positioning management system 14 extracts an ownship position data from the ADS-B IN data. This position data is used in an augmented algorithm to consolidate the aircraft position information with other sources to increase the accuracy and integrity of the aircraft position. The ADS-B IN data can be received from at least one of an internal ADS-B sensor built-in the aircraft hardware, an external ADS-B sensor connected to the aircraft hardware, and an Aircraft Interface Device (AID) if the aircraft is equipped with the ADS-B IN capability.

In another embodiment, the aircraft positioning management system 14 interfaces with a wireless communication facility, such as a Wifi access point, and performs a geolocalization for determining the aircraft position. This Wifi data is also used in the augmented algorithm to consolidate the aircraft position information with other sources to increase the accuracy and integrity of the aircraft position. Other airport facilities, such as radar, can also be used in determining the aircraft position if the airport is equipped with a ground surveillance infrastructure. The aircraft positioning management system 14 receives the aircraft position information from the various sources as described above, and augment the accuracy and integrity of the aircraft positional information. Optionally and under previously defined conditions, the flight crew member has an option to selectively activate or deactivate certain data sources based on an operational experience during a predetermined period.

The taxi path display system 16 provides at least four levels of display options for displaying the taxi path based on the quality (e.g., integrity and accuracy) of the aircraft positional information using the COTS tablet. Other suitable display devices are contemplated to suit the application. A first level of display option provides a static display of the taxi path without the aircraft position. The taxi clearance is entered and updated manually by the crew without any automation for update of the taxi path. This option is always available for the crew, and takes advantage of the interaction means as described in the interaction means management system 12 (Part A).

In a second level of display option, the GNSS position is at least partially available, but no GNSS position is guaranteed. Specifically, it is not feasible to display the ownship position as realized in an Airport Moving Map (AMM) application as an industry certification constraint is not met (e.g., as mandated in the AMC 20-25). However, in this option, the present AGDB is utilized for displaying the taxi path update based on the GNSS positional information, the augmentation of the GNSS position (if available), and the correlation of the topology of the airport layout. Optionally, no aircraft symbol is displayed, but the representation of the taxi path is progressively truncated in relation with the progress of the aircraft taxiing.

In a third level of display option, the GNSS position is available and the GNSS performance is guaranteed to meet the certification requirement. The aircraft position is displayed on an airport map layout. The use of the algorithms, such as those used to improve the aircraft positional information, allow an optimal representation of the ownship position and the taxi path.

A fourth level of display option corresponds to the GNSS position and the taxi path with a level of GNSS performance for allowing the guidance of the aircraft. This level allows potential uses and benefits for low visibility operations or for automatic guidance if the taxi trajectory is coupled with an Automatic Pilot for ground control.

Figure 2:
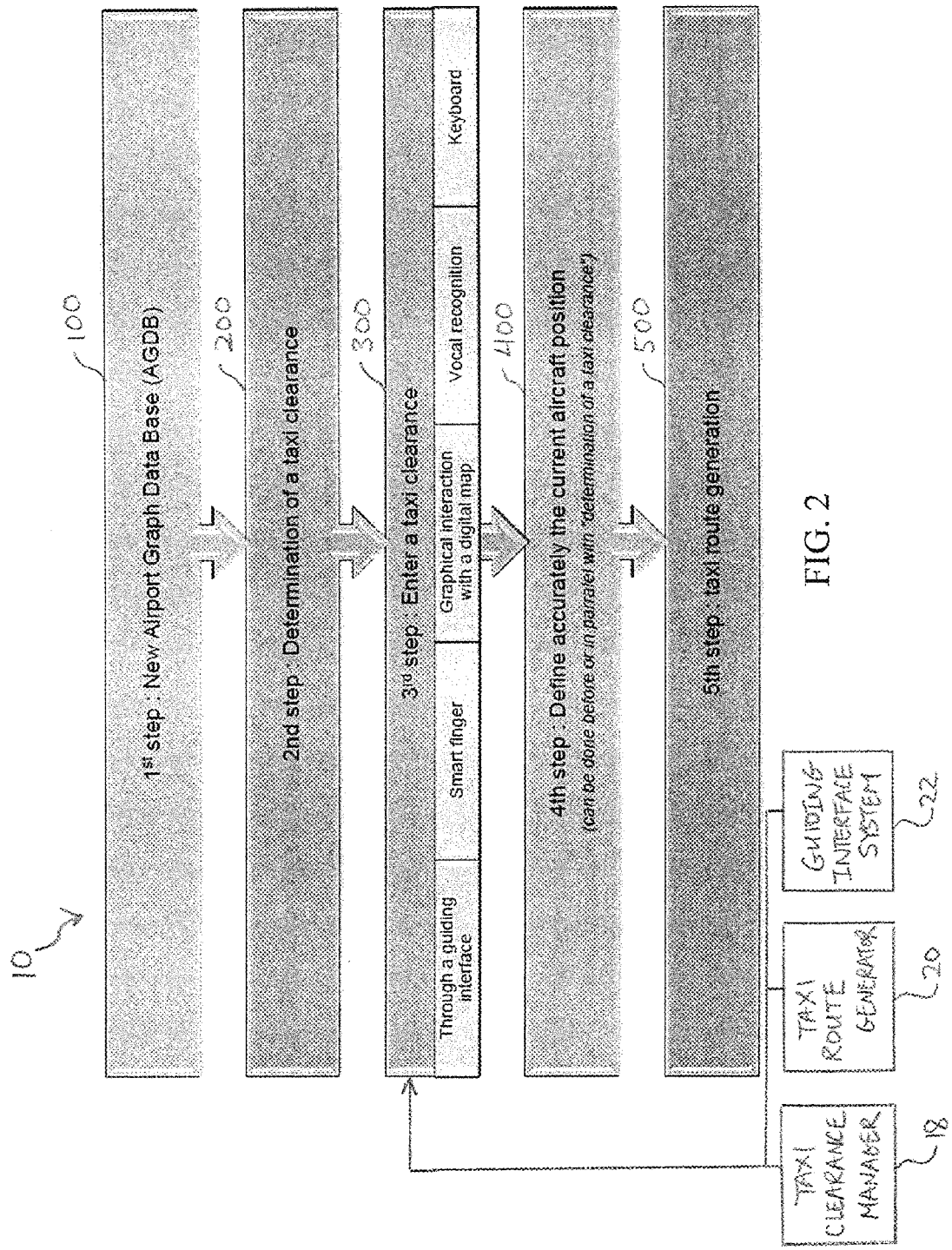
FIG. 2 is a flow chart of executing the present taxiing path optimization system.

Referring now to FIG. 2, an exemplary method of executing the present taxiing path optimization system 10 is illustrated. Although the following steps are primarily described with respect to the embodiments of FIG. 1, it should be understood that the steps within the method may be modified and executed in a different order or sequence without altering the principles of the present disclosure.

The method begins at step 100. In step 100, the present taxiing path optimization system 10 builds an improved display-independent and geometrically-based Airport Graph Database (AGDB) for describing a flow graph of a corresponding airport. It is also contemplated that the AGDB is built off-line, and the present taxiing path optimization system loads the AGDB built off-line. The present AGDB represents a description of all potential taxi ground trajectories or routes that could take the aircraft, using a geo-referenced geometrical description and a logical flow graph description, including taxiways, runways, parking areas, deicing points, and the like. Included in the flow graph are nodes, links (or edges) between two nodes, and elements. Each element includes a continuous set of links describing an airport element, such as taxiways, runways, parking area, and the like.

The flow graph may include a geometrical description of possible trajectories of the aircraft on the ground, and has points (i.e., geo-referenced points) and curves (i.e., mathematical lines defined by a set of points). In a preferred embodiment, the Bézier curve algorithm is used to define a smooth curve, but other suitable curve algorithms, such as B-splines, or Nonuniform Rational B-splines (NURBS) algorithms, are also contemplated.

A Bézier curve is comprised of a set of control points which define the smooth curve that can be scaled indefinitely. For example only, each Bézier curve may be defined by polynomial equations, as provided by expression (1):

$$B(t) = \Sigma_{i=0}^{n} b_{i,n}(t) P_i, t \in [0,1] \quad (1)$$

where $P_i$ are the control points of the Bézier curve, $b_{i,n}$ are the Bernstein base polynomials of degree n defined as provided by expression (2):

$$b_{i,n}(t) = \binom{n}{i} t^i (1-t)^{n-i}, i = 0, \ldots, n \quad (2)$$

In a preferred embodiment, the $1^{st}$ and $3^{rd}$ orders of Bézier curves are used, but other orders (e.g., higher orders) are also contemplated. For example only, exemplary first and third orders of the Bézier curve may be defined as provided by expressions (3) and (4):

1st order Bézier curve, representing a straight line, is defined as $$B(t)=(1-t)P_0+tP_1 \qquad (3)$$

3$^{rd}$ order Bézier curve, representing a smooth curve, is defined as $$B(t)=(1-t)^3P_0+(1-t)^2tP_1+(1-t)t^2P_2+t^3P_3 \qquad (4)$$

A primary use of the present AGDB is to support a computation of taxi routes (i.e., ground trajectories). The computed taxi routes are designed to accurately support a ground guidance of the aircraft, ensuring appropriate data accuracy and integrity of industrialization process requirements. Another use of the present AGDB is to display a taxi route, which is display-independent, and thus various background maps can be used for simultaneous display, e.g., in conjunction with an Airport Mapping Database (AMDB), Navtech® eCharts, satellite orthoimages, and other suitable geo-reference backgrounds. Further, the computed taxi routes take into account aircraft capabilities, such as the ACN, PCN, a turning radius and a maximum wingspan of the aircraft.

Figures 3, 4:
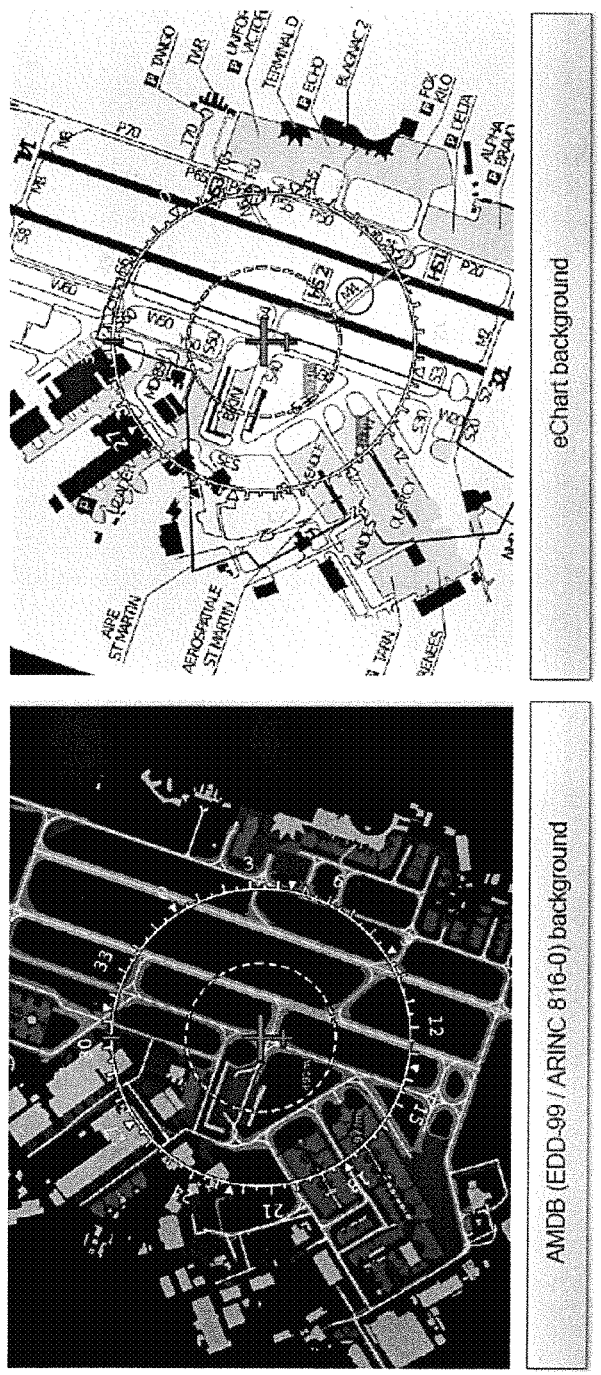
FIGS. 3-7 illustrate exemplary visualizations of various airport layouts and displays being used as the background maps of the present taxiing path optimization system.
Figure 5:
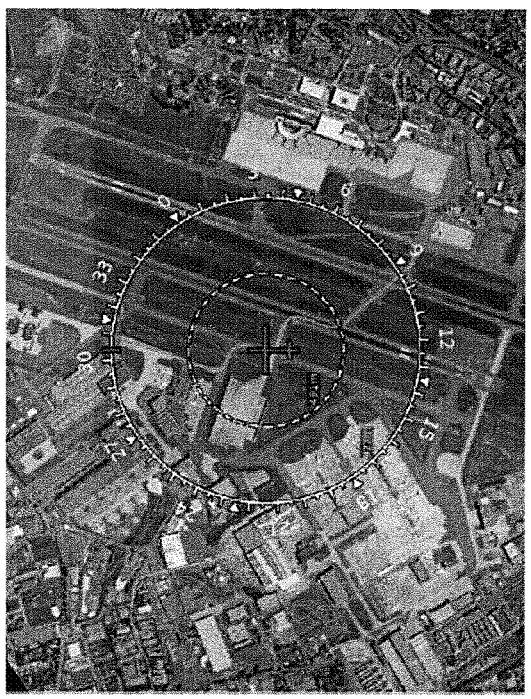
Figure 6:
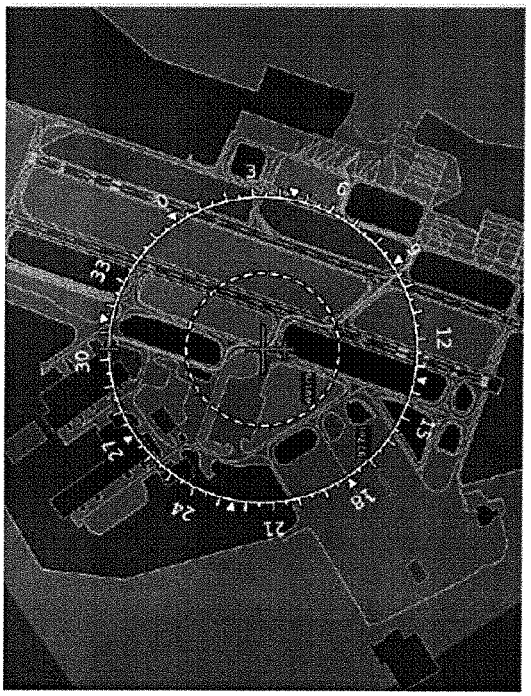
Figure 7:
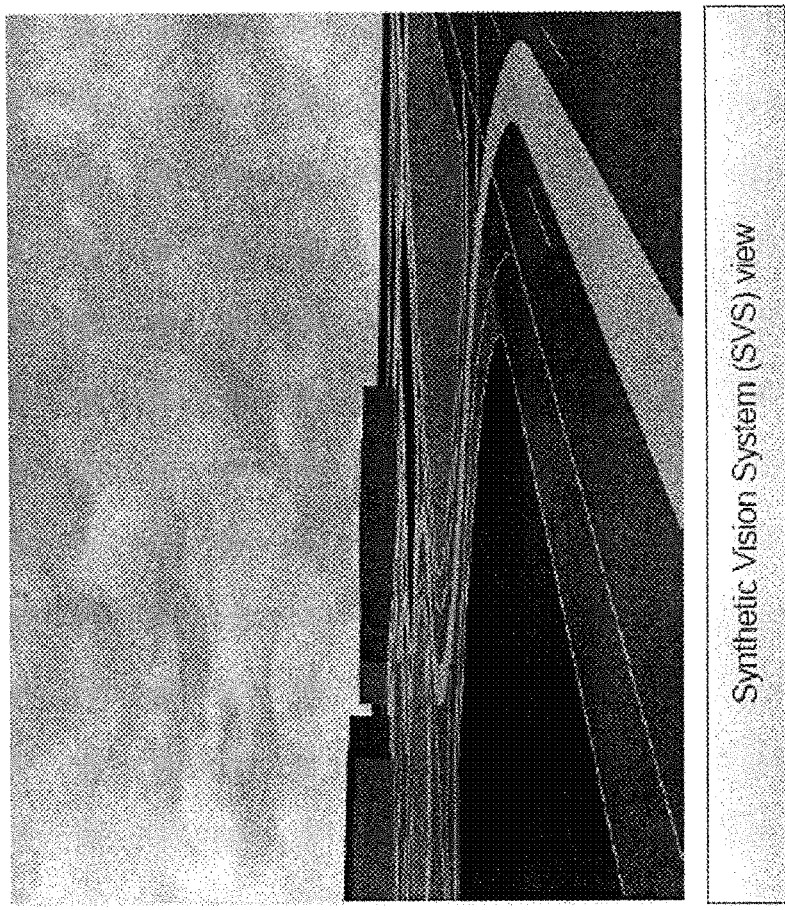

Referring now to FIGS. 3-7, examples of various airport layouts and displays are illustrated for use as the background maps of the present taxiing path optimization system 10. FIG. 3 illustrates an exemplary AMDB background map. FIG. 4 illustrates an exemplary eCharts background map. FIG. 5 illustrates an exemplary synthetic airport background map. FIG. 6 illustrates an exemplary aerial orthophoto background map. FIG. 7 illustrates an exemplary synthetic vision system (SVS) view background map. Other suitable background maps are also contemplated to suit different applications.

Returning now to FIG. 2, an important aspect of the present AGDB is that it is designed to generate smooth ground trajectories for the aircraft taxiing operations. Specifically, the ground trajectories are continuous (without holes or gaps), and a derivative of each route has no cusp points (i.e., tangents continuity). Also, the taxi routes computed with the present AGDB can be compatible with all aircrafts allowed on a given airport. A corresponding geometrical dual of a node is called a point. However, a geometrical point does not necessarily have to have a corresponding logical dual (i.e., a node). There may only be a construction point necessary to define an associated curve. A geometrical dual of a link is also defined by a continuous set of curves. Further, each curve has a logical dual (i.e., a link). One or more curves can have the same logical dual, and thus the geometrical dual of the link may be a set of curves.

The present AGDB provides a pre-computed connectivity list for each link such that each link realizes to which links and via which nodes the link is connected. Further provided in the present AGDB is a pre-computed dual relationship between the geometrical and logical duals. For example, each point realizes its associated dual node (if the dual node exists), and each node realizes its associated dual point (as the dual point always exists). This configuration is similarly constructed and arranged for a curve-link pair and a link-element pair in the AGDB. It is contemplated that the present AGDB is built manually, but using other suitable dedicated software tools is also contemplated.

In a preferred embodiment, the present AGDB includes metadata having an International Civil Aviation Organization (ICAO) 4-letter Airport Identifier, date, author, source origin of the AGDB, accuracy and integrity of data, projection used (e.g., earth coordinates for mapping), comments, and the like. The present AGDB further includes a set of lists of points, curves, nodes, links, and airport elements, which are described in greater detail below.

Figure 8:
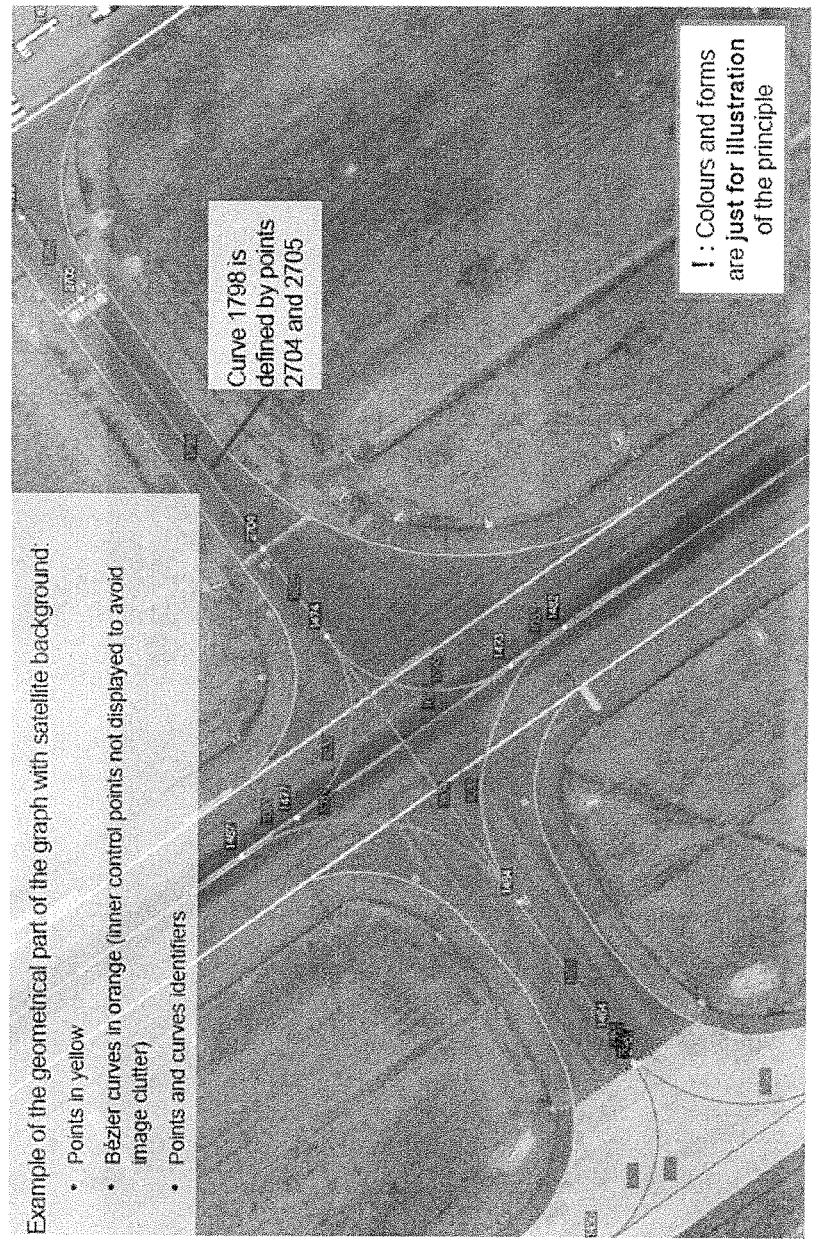
FIG. 8 illustrates an exemplary visualization of a geometrical part of a flow graph with a satellite background.

Referring now to FIG. 8, each control point is a geometrical punctual object defined by at least one of a unique point identifier, a set of coordinates, a dual node identifier, a list of curves using this point, and the metadata as described above. In one embodiment, the coordinates include latitude, longitude, and altitude locations in earth coordinates (e.g., World Geodetic System (WGS84) referential), or X/Y/Z axis values in projected coordinates.

Each curve is a geometrical linear object defined by at least one of a unique curve identifier, a set of control points identifiers, a dual link identifier, a curve length, and the metadata as described above. A list of control points identifiers having a curve length of four (4) has four control points. Thus, in case of a segment having a 1st order Bézier curve, inner control points can be set to −1. For example, the list of control points identifiers [25 64 95 32] defines a 3$^{rd}$ order Bézier curve (BC3), and [75-1-1 12] defines a 1$^{st}$ order Bézier curve (BC1).

FIG. 8 shows an exemplary geometric part of the flow graph with a satellite background map. Points are designated, for example, 1457, 1477, 1474, 1473, etc. Curves are designated, for example, 1030, 1032, 1028, 1034, etc. For example, the curve 1798 is defined by points 2704 and 2705.

Figure 9:
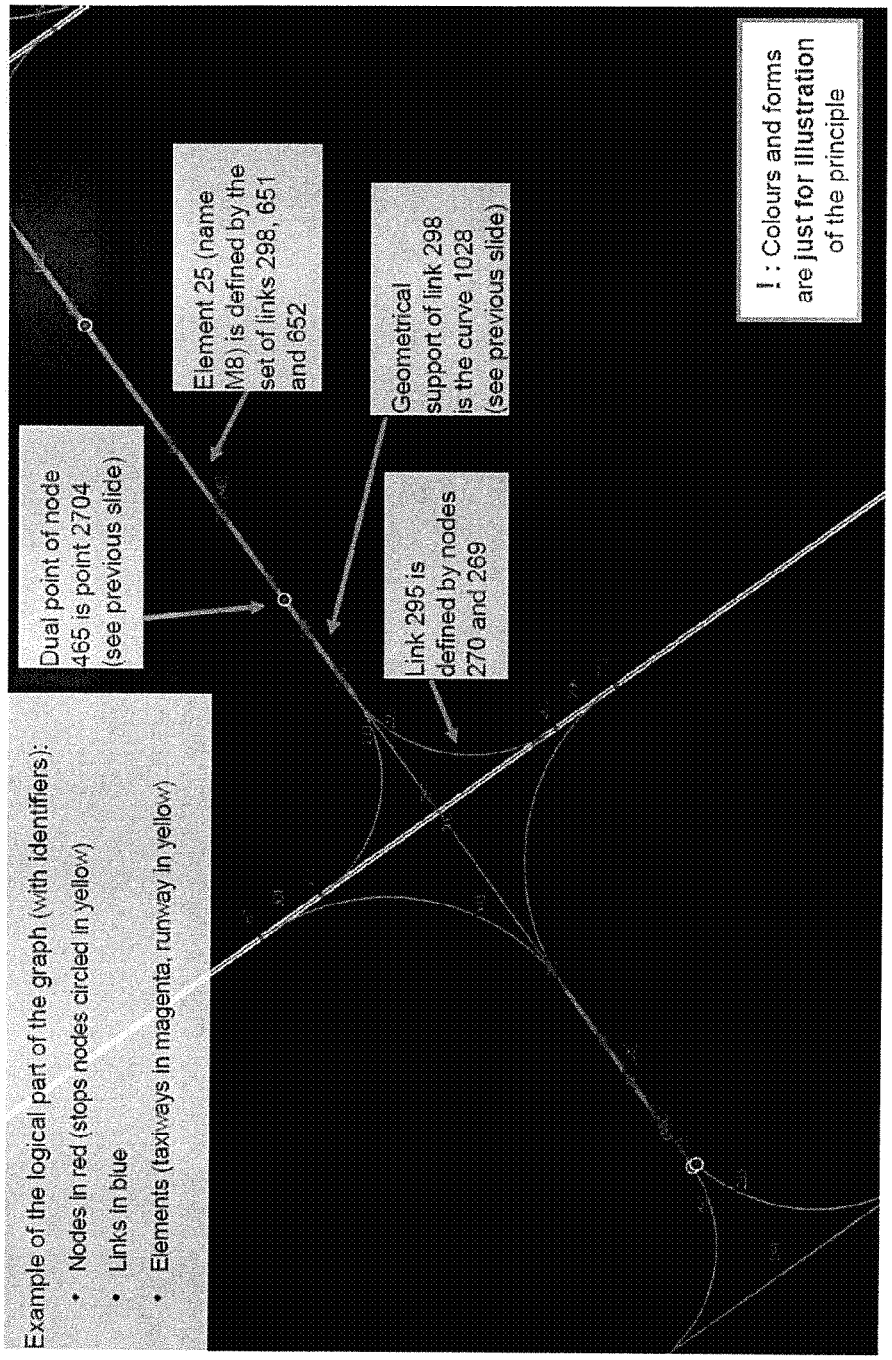
FIG. 9 illustrates an exemplary visualization of a logical part of a flow graph with identifiers.

Referring now to FIG. 9, each node is a logical punctual object defined by at least one of a unique node identifier, a node type, a dual point identifier, a list of links using this node, and the metadata as described above. In one embodiment, the node type includes at least one of a switching point, a dead-end, a parking stand, a deicing point, a stop, and a change of characteristics (e.g., PCN, a maximum wingspan). It is preferred that each node has a corresponding dual point.

Each link (or edge) is a logical linear object defined by at least one of a unique link identifier, an initial node identifier, a final node identifier, a list of dual curves identifiers, an element identifier defined by the link, a link length, a link direction, a list of connectivity of the link, and the metadata as described above. It is also contemplated that other suitable attributes are additionally used for defining the link, such as a max curvature of the link, a PCN of the link, and a maximum wingspan allowed on the link. At least one list of dual curves identifiers is included in the link for describing a geometrical path joining the initial and final nodes. The link direction can be either one-way or two-ways, where the order of the one-way direction (e.g., direct or inverse) is defined by the initial node and the final node. A list of doublets [Id_Link, Id_Node], representing the connectivity of the link, is interpreted as that the aircraft can travel from the current link to the Id_Link via Id_Node, which is common to both links, with a smooth trajectory without holes and cusp points.

Each element is a logical linear object defined by at least one of a unique element identifier, an element type, an element name, a list of node identifiers, a list of link identifiers, and the metadata as described above. The element type may include a taxiway, a runway, a parking line, and the like. The element name may be defined as <<14L>> for a runway, but other suitable symbols are also used to describe different airport elements to suit the application. The list of node identifiers included in the element must have at least two node identifiers, and the list of links identifiers included in the element must have at least one link identifier for describing a logical path to join successive nodes.

FIG. 9 shows an exemplary logical part of the flow graph is shown. Nodes are designated, for example, 183, 271, 268, 269, 213, etc. Links are designated, for example, 303, 299, 296, etc. Elements are designated, for example, 22 [S8], 25 [M8], etc. For example, the element 25 (named M8) is defined by the set of links 298, 651, and 652. Link 295 is defined by nodes 270 and 269. As shown in FIGS. 8 and 9, a corresponding dual point of node 466 is point 2704 (FIG. 8), and a geometrical support of link 298 is the curve 1028 (FIG. 8).

Figure 10:
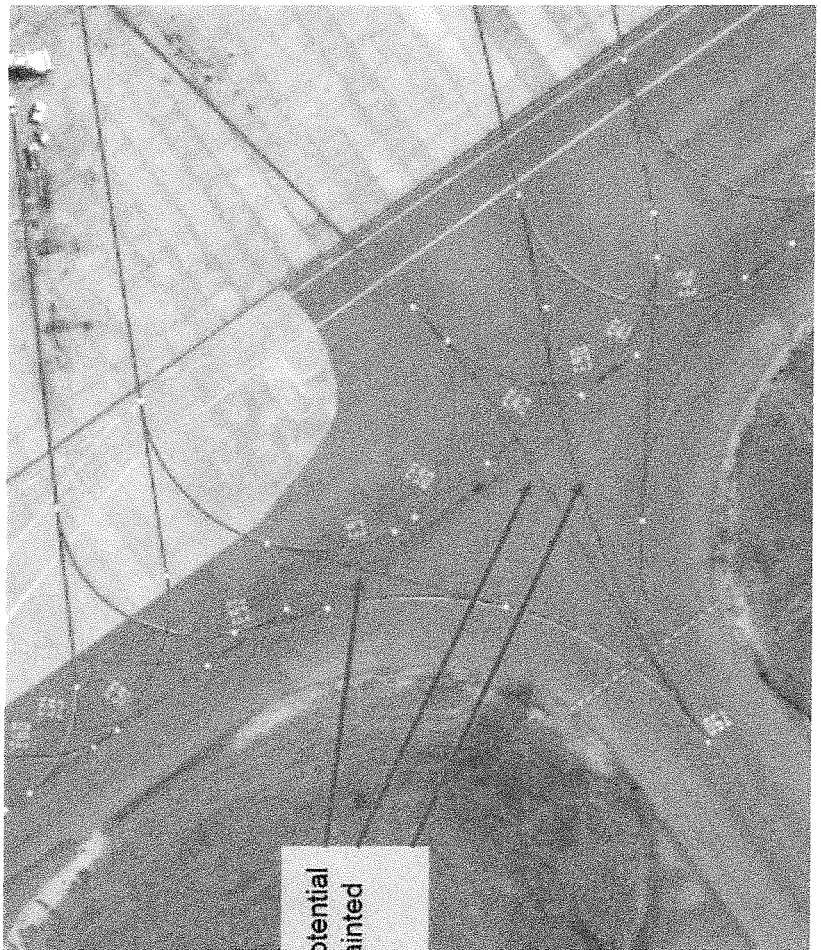
FIG. 10 illustrates exemplary exhaustive potential on-ground trajectories of a corresponding aircraft during taxiing operations.

FIG. 10 shows exemplary exhaustive potential trajectories indicated by arrows on the on-board display even if the trajectories are not physically painted on the airport ground. As discussed above, the AGDB built by the present taxiing path optimization system 10 represents a description of all potential taxi ground trajectories or routes that could take the aircraft, using a geo-referenced geometrical description and a logical flow graph description, including taxiways, runways, parking areas, deicing points, and the like.

Figure 11:
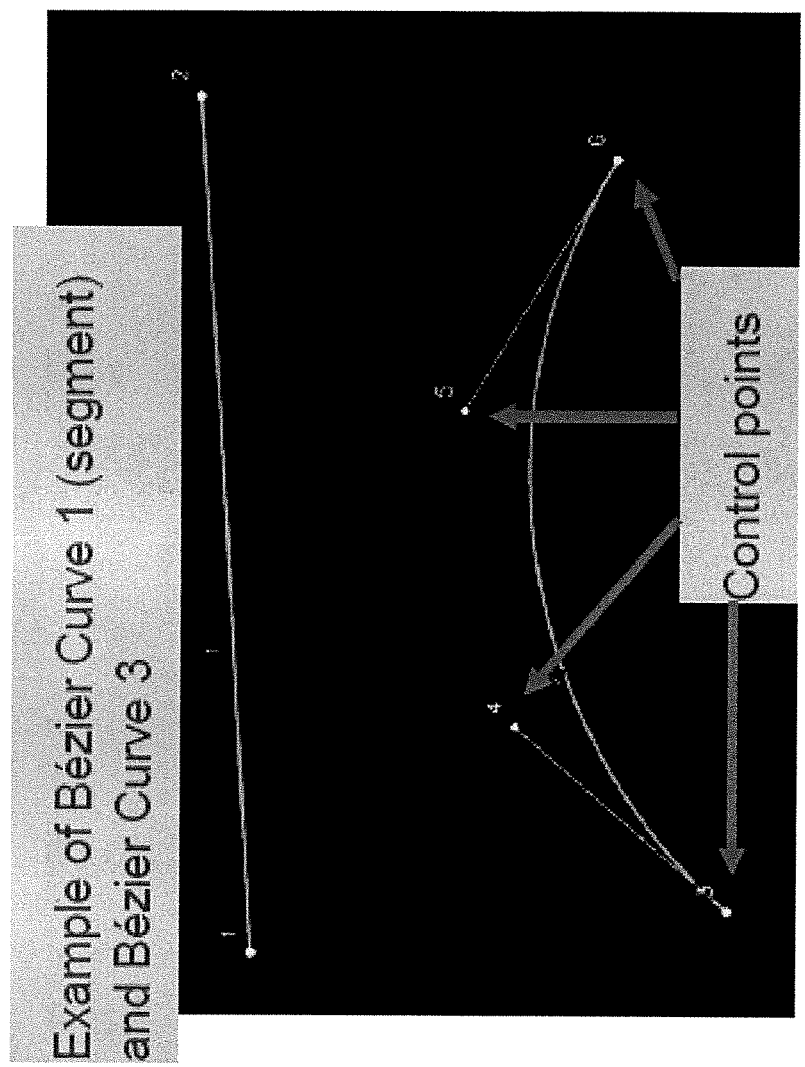
FIG. 11 illustrates connectivity examples using Bézier curves.

Referring now to FIG. 11, connectivity examples are shown using the Bézier curves. For example, the 1st order Bézier curve 1 (i.e., a straight line or a segment) is defined by two points 1 and 2, and the $3^{rd}$ order Bézier curve 2 is defined by four control points 3, 4, 5, and 6. The first and last control points are always on the curve.

Figure 12:
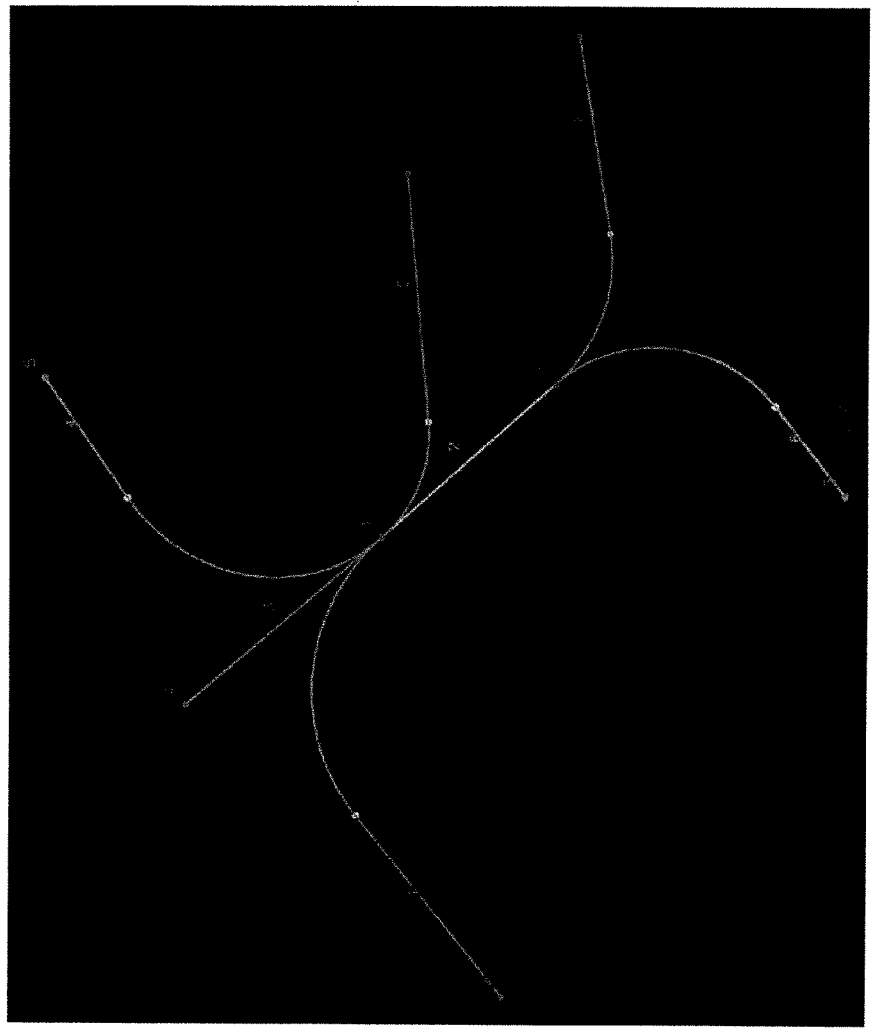
FIGS. 12 and 13 illustrate exemplary connectivity links used in the present taxiing path optimization system.

Referring now to FIG. 12, an exemplary connectivity link is shown. For example, link 2 is connected to link 1 via node 1, also to link 3 via node 1, also to link 4 via node 1, also to link 6 via node 7, and also to link 7 via node 7. Notably, link 2 is not connected to link 5 via node 1 because Node 1 is a cusp point for a trajectory traveling from link 2 to link 5. Thus, link 5 is excluded from the pre-computed connectivity list.

Figure 13:
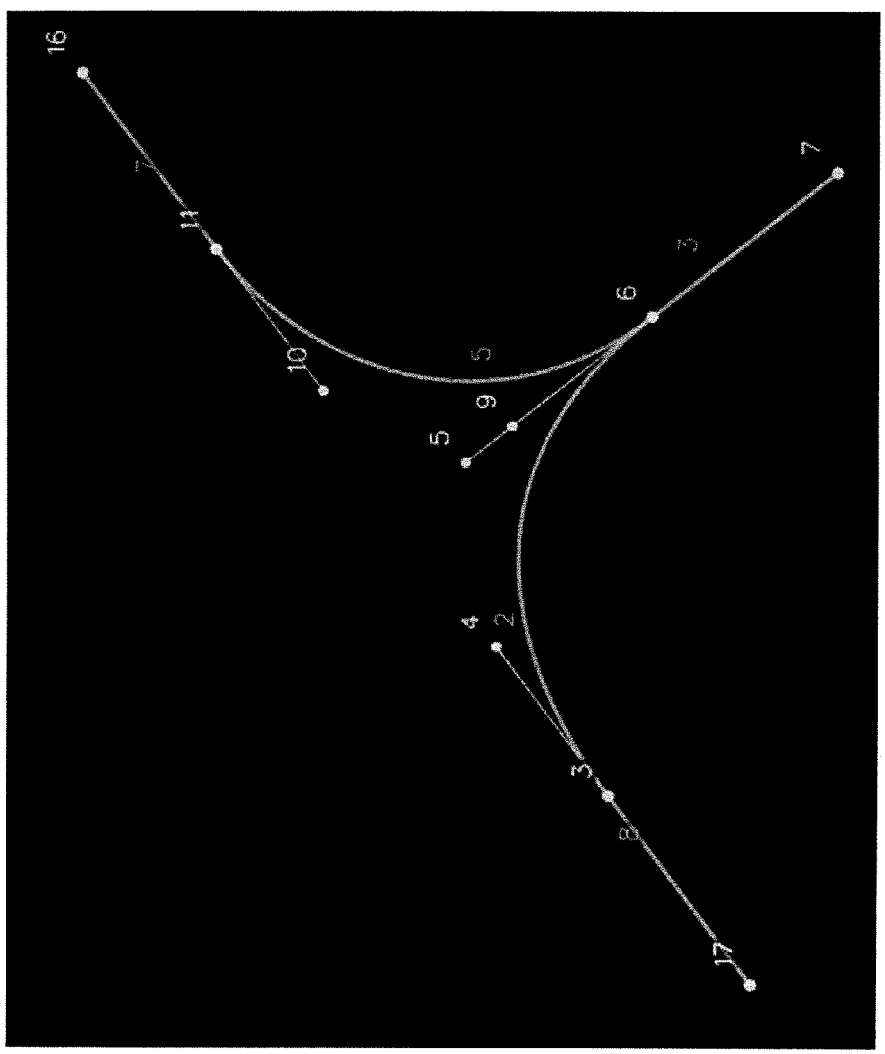

Referring now to FIG. 13, in a preferred embodiment, the present AGDB is built with a set of predetermined rules. Exemplary rules include enforcing continuity of tangents at each point, and curvature constraints for limiting a minimal local radius of a curve such that the result curve is smooth and representative of a potential trajectory of the aircraft on the ground. For example, the curve 2 is built so that its tangent at point 3 (represented by segment [3, 4]) is aligned with curve 8. As a result, point 3 is not a cusp point or a break point for a trajectory traveling from curve 8 to curve 2, thereby leading to a smooth trajectory. Identical building rules are applied at points 6 and 11.

Returning now to FIG. 2, in step 200, the present taxiing path optimization system 10 determines a final or modified taxi clearance based on an initial taxi clearance inputted by the crew or received from other related systems. Initially, the pilot (or the flight crew) must enter the clearance into the present system 10 using the keyboard or other suitable tactile interactive devices for computing the corresponding taxi route on the digital map for display. If the taxi clearance contains two elements, then these clearance elements are necessarily the departure and the destination. In this case, there is no ambiguity, and the taxi clearance is computed as inputted.

However, if the taxi clearance contains at least three elements, the present system 10 computes two taxi routes, considering both taxi clearance types (i.e., the destination is the last element, or the second element in the taxi clearance). An exemplary method is illustrated in step 500 below for computing a taxi route based on the inputted taxi clearance. The present system 10 determines or finalizes the taxi clearance based on the inputted taxi clearance. For example, when the present system 10 does not find any acceptable solution for the inputted taxi clearance due to a database or system error, a taxi clearance data input error, or an impossible taxi clearance error, the present system generates a warning signal or message to the flight crew for a corrective action.

When there is only one taxi route solution available for the taxi clearance, the present system 10 selects the solution as the final taxi clearance, but when there are multiple taxi route solutions available, the present system selects one of the solutions based on a set of predetermined criteria. In one embodiment, the predetermined criteria include at least one of a shortest length, and a smallest number of airport elements, which are not explicitly entered by the crew in its initial clearance. When the present system 10 determines the final taxi clearance, the present system proposes a consolidated taxi clearance to the crew for validating the proposal. In one embodiment, the proposed taxi clearance may be reordered, and be used as an input to other related systems, such as a system for computing the taxi route, or other guidance applications.

In step 300, the flight crew enters a taxi clearance by inputting clearance elements into the present taxiing path optimization system 10 using the keyboard or other suitable tactile interactive devices, such as the Smart Finger and the voice recognition system, and the like. It is preferred that at least four types of operations are performed by the present system 10, namely Add, Insert, Modify, and Remove.

The Add operation refers to adding a new clearance element at the end of the taxi clearance, where the addition of the new element is performed at the end of the pre-existing clearance element sequence. The Insert operation refers to inserting the new clearance element into the taxi clearance. For example, the insertion of the new element in the middle of the clearance is achieved by pinching two fingers between two elements already entered, and then selecting the new element to be inserted directly on the map or by typing the identifier on a virtual keyboard.

The Modify operation refers to revising the element of the taxi clearance. For example, the crew selects the clearance element on the displayed clearance sequence text, and then enters the new element to replace the selected element. The Remove operation refers to deleting the selected element from the taxi clearance. When one of the four operations is performed, the present system 10 or a subsystem of the present system, such as a taxi clearance manager 18, updates the taxi clearance, and sends the updated sequence to another subsystem of the present system, such as a taxi route generator 20. For example, the taxi route generator 20 computes or creates a taxi route, which is displayed for the flight crew, and a consolidated taxi clearance, which is also displayed for the flight crew to fill any gaps or holes in the clearance sequence as desired.

In a preferred embodiment, the present system 10 provides a guiding interface system 22. An important feature of the guiding interface system 22 is that it provides an unelectable look and feel for nonexistent labels on the keyboard. For example, if the airport has elements with alphanumeric labels beginning with a character from "A" to "S" only (plus numeric values concatenated at the end), then the guiding interface system 22 causes the keys from "T" to "Z" unselectable from the keyboard because these keys are not being used in the present system 10.

It is preferred that the present AGDB collects a list of all possible elements of the airport, and saves the list in memory for later use. Thus, as the flight crew enters letters and numbers into the present system 10 as part of the taxi clearance sequence, the guiding interface system 22 selectively invalidates the keys from the keyboard based on the saved element list. For example, if the saved element list includes elements beginning with a letter "P," such as P20, P30, P40, P60, P70, and the pilot has already entered "P", then the guiding interface system 22 causes the keys having numbers "0," "1," "5," "8," and "9" unselectable or invalid because such numbers do not follow the letter "P" as evidenced in the element list. This invalidation method iteratively applies to the rest of characters in each element.

Another important feature of the guiding interface system 22 is that, after each clearance element is entered into the present system 10, the guiding interface system 22 automatically detects airport elements (whether adjacent or not) and creates a pre-filter by highlighting corresponding labels on the digital map for considering precision of the aircraft position. These highlighted elements attract and guide the crew during taxi clearance operations. It is noted, however, that the guiding interface system 22 does not prevent a selection of other elements not highlighted or not directly connected to the current element. In another embodiment, the keyboard highlights all elements from an airport whether they are adjacent are not. This creates a pre-filter that limits the number of possible inputs without being too restrictive. In some cases, adjacent elements are rarely given in a taxi clearance.

In a preferred embodiment, to accelerate a manual entry of the clearance element name on the keyboard, the guiding interface system 22 highlights all possible combinations of letters and numbers following a preceding character. For example, if the possible next elements are W40, W50, and Y50, the guiding interface system 22 highlights the letters "W" and "Y." Subsequently, if the crew enters the letter "W," the guiding interface system 22 highlights the numbers "4" and "5." Next, if the crew enters the number "5," the guiding interface system 22 highlights the number "0" only since "W50" is the last possible next element.

As such, the guiding interface system 22 computes the list of next possible elements at each character entry. More specifically, the guiding interface system 22 determines the last link of the current taxi route. The taxi route generation process is described in greater detail below in relation to step 500. Also, the guiding interface system 22 follows each link connected to the last link of the taxi route until a link associated with an element is found. The guiding interface system 22 saves the name of each element found in the element list, and the element list is used to highlight the element labels or keys as described above.

Figure 14:
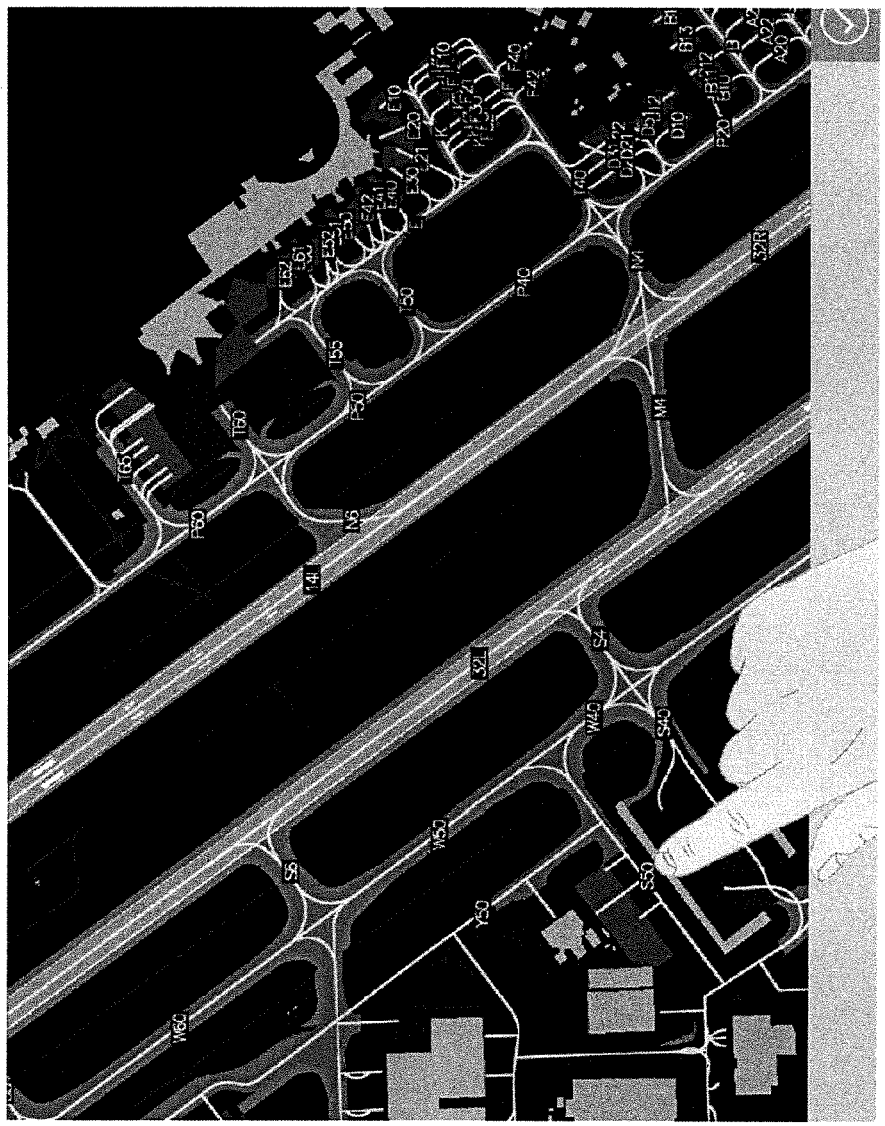
FIGS. 14-21 illustrate an exemplary combinational use of a Smart Finger system and a virtual keyboard for the present taxiing path optimization system.
Figure 15:
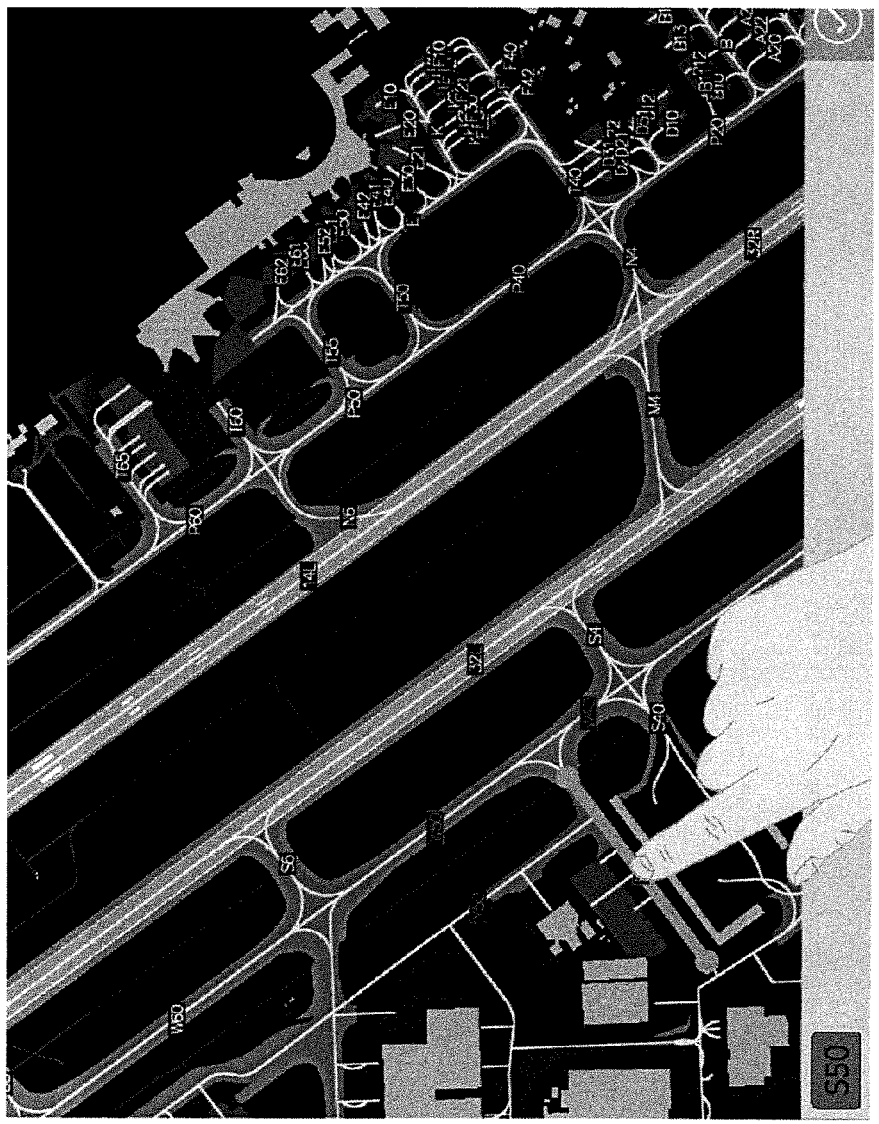

Referring now to FIGS. 14-21, an exemplary Smart Finger system is shown. An important feature of the Smart Finger system is that a user may draw a path on a digital display with a fingertip, but other suitable devices, such as a mouse, a digital pen, and the like, are contemplated to suit the application. FIG. 14 illustrates that the user (e.g., a pilot or a flight crew) selects an initial taxiway S50 by clicking directly on a taxiway element shown on the digital display. FIG. 15 illustrates that the Smart Finger system provides a feedback to the user by highlighting or coloring the selected taxiway S50, for example, in green. Also, the element name S50 is displayed on a command line disposed at the bottom of the display for convenience. Other orientations of the command line are also contemplated.

Figure 16:
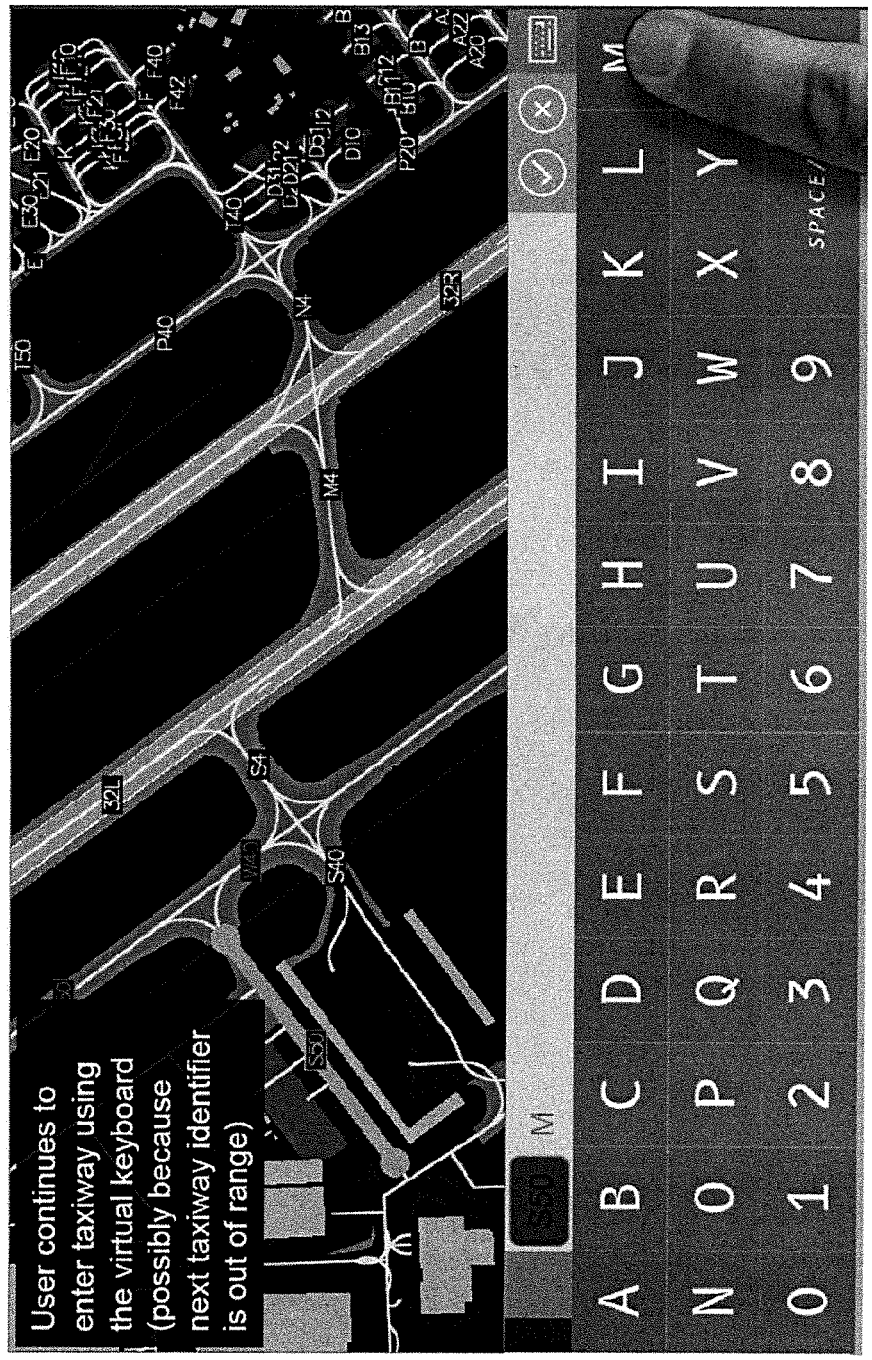
Figure 17:
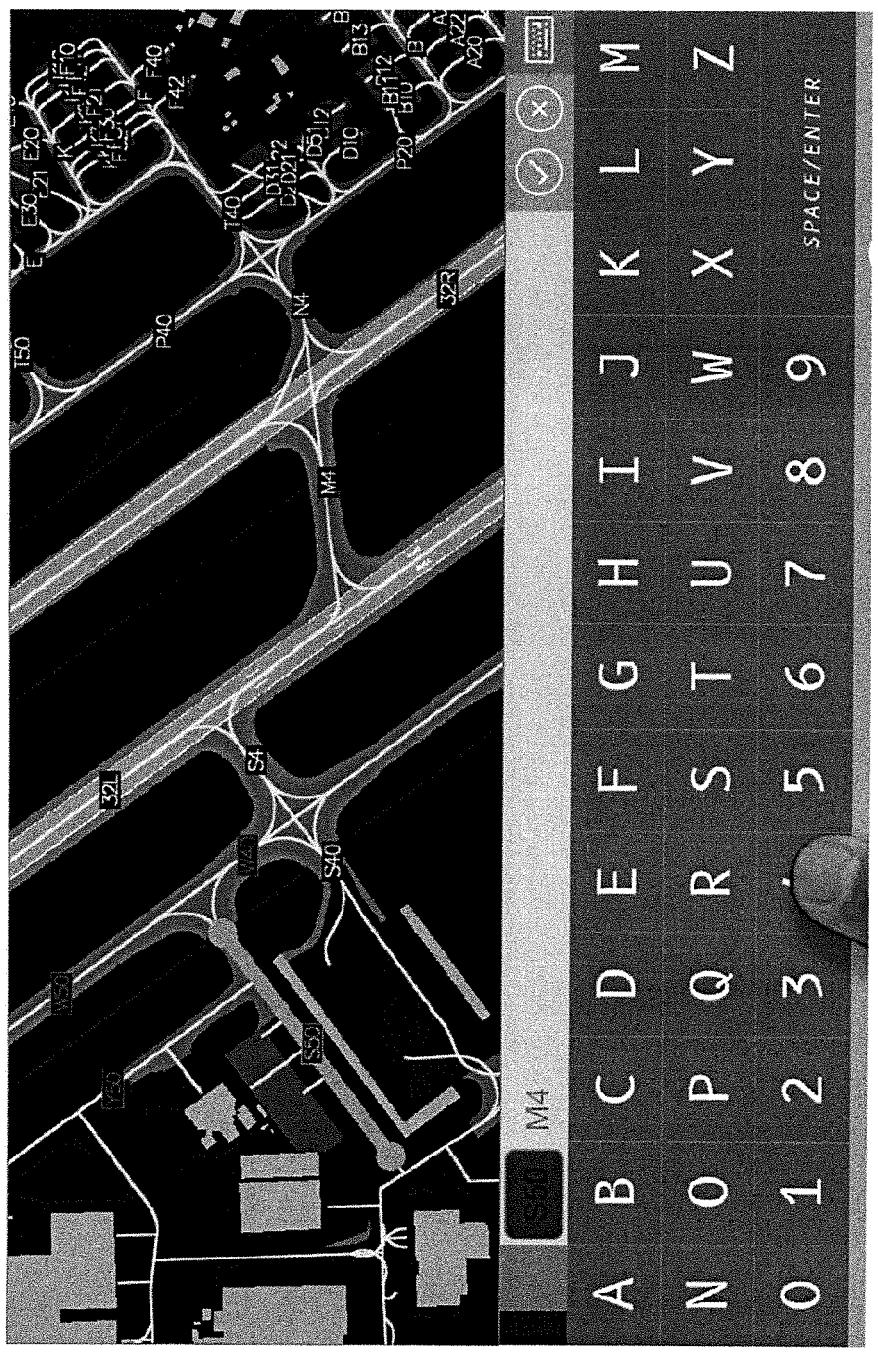
Figure 18:
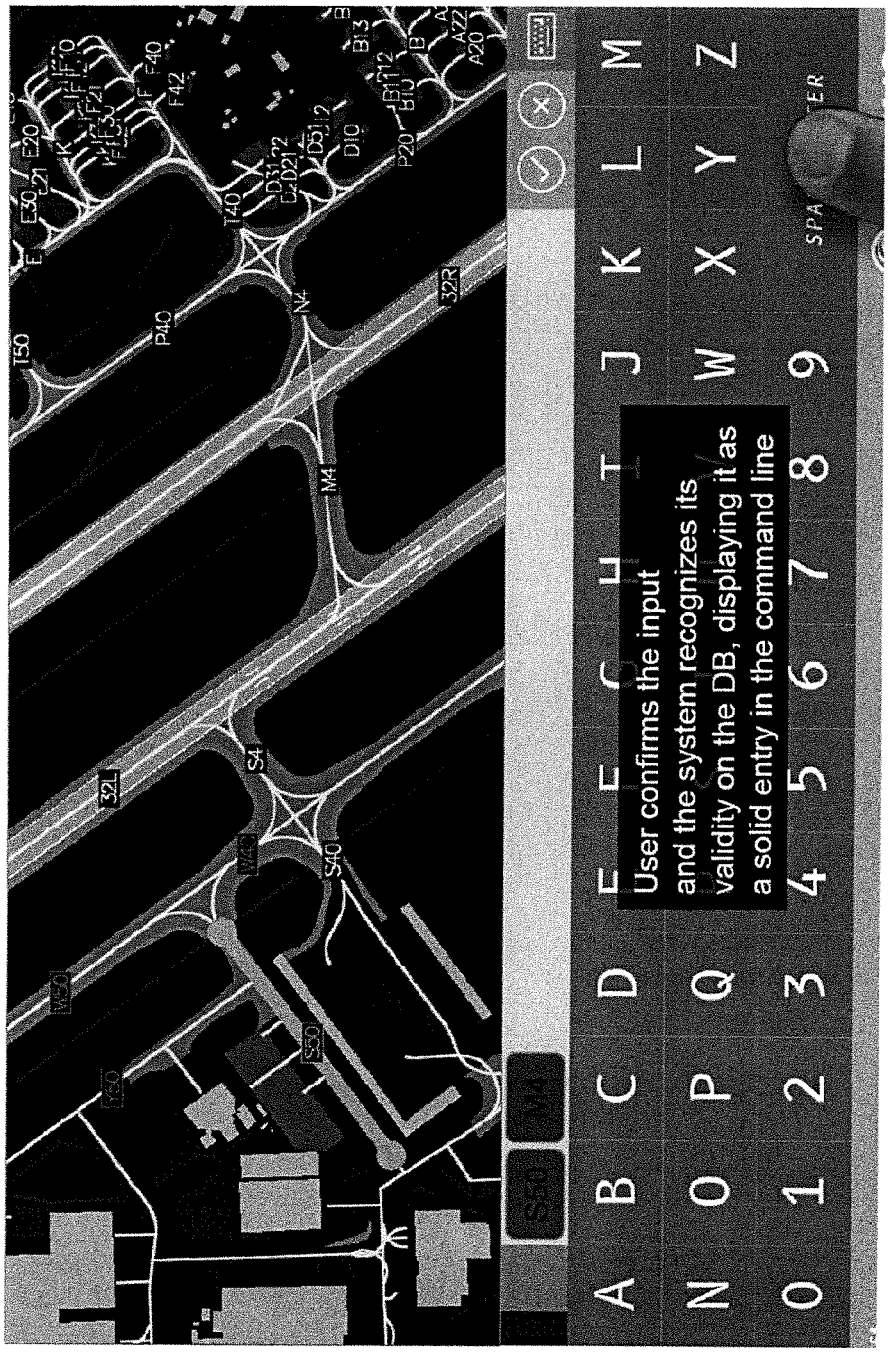

FIGS. 16 and 17 illustrates that the user can also enter a next taxiway M4 using a virtual keyboard instead of clicking directly on the taxiway element. The virtual keyboard may be used when the next taxiway identifier is out of range or not shown on the display. FIG. 18 illustrates that the user confirms the inputted element name by clicking on the Enter button on the virtual keyboard. The Smart Finger system confirms the validity of the element name M4 against the present AGDB, and displays the element name M4 as a solid entry in the command line of the display.

Figure 19:
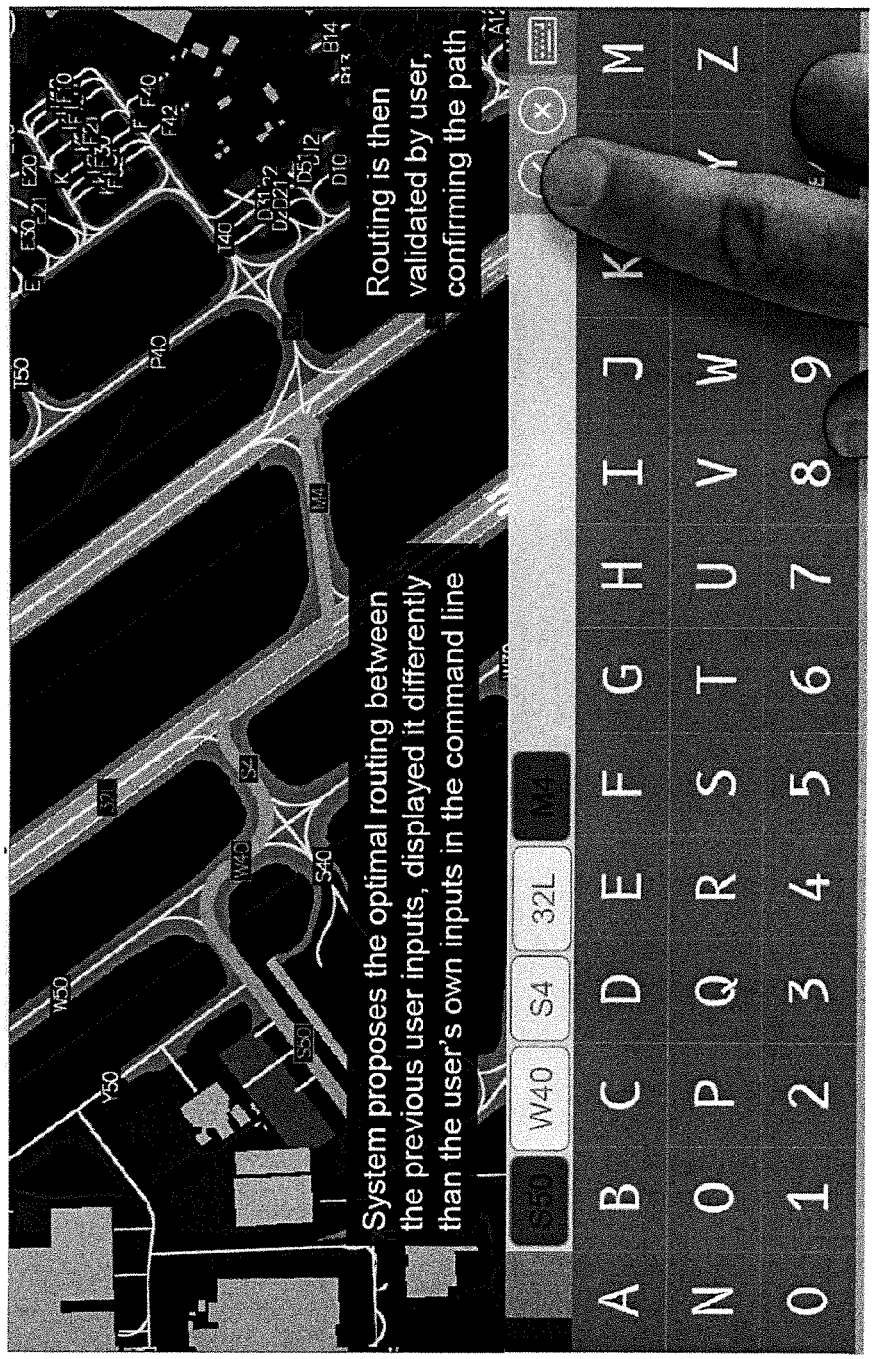

FIG. 19 illustrates that the present system 10 proposes an optimal taxi routing between the inputted element names (e.g., as the departure and destination points) by displaying element names that are different from the inputted element names. For example, the elements W40, S4, and 32L are inserted between the inputted elements S50 and M4, and the taxi route having the elements S50, W40, S4, 32L, M4 is highlighted on the display for confirmation. The taxi route selected by the present system 10 is then validated by clicking on the Check button on the virtual keyboard.

Figure 20:
Figure 21:

FIGS. 20 and 21 illustrate an exemplary raw drawing method for inputting the taxi clearance on the display using the Smart Finger system. In one embodiment, the Smart Finger system includes a tactile finger interaction device with a touch-sensitive screen using the present AGDB for recognizing the inputted taxi clearance. As shown in FIG. 20, the user draws a line directly on the digital map using a dedicated input device, such as the finger tactile interaction device, the touch-sensitive screen, a digital pen and pad, a mouse, a trackball, and the like. Optionally, the user enters a desired taxi clearance in an edition mode. This raw drawing does not have to be accurate because the Smart Finger system recognizes general positions and directions of the line on the digital map in terms of taxi clearance sequence. The line is highlighted in a first color, e.g., yellow.

FIG. 21 illustrates that the Smart Finger system may recognize the clearance portion drawn by the user, or may propose a different computed taxi clearance based on the raw drawing. More specifically, the raw drawing is converted into a vector of map coordinates. For example, the Smart Finger system records all successive finger positions in screen coordinates during the raw drawing process, and then computes, for each position on the display, a position on the digital map in latitude-longitude coordinates, or in metric coordinates. Alternatively, the X/Y coordinate vector in map coordinates can be used. An exemplary finger position vector may include the X/Y coordinates of [103.5 56.3] [103.7 56.1] [104.3 55.4] . . . [152.3 26.1]. As an example, these coordinate numbers represent X/Y coordinates inputted by the user, and FIG. 21 illustrates a succession of two-dimensional points. These X/Y coordinates may be expressed in a reference system of the underlying map (e.g., in meters with respect to a given reference point), or may be expressed in pixels with respect to the screen coordinates.

In a preferred embodiment, the Smart Finger system executes a predefined algorithm to generate a set of successive element identifiers for representing the recognized taxi clearance sequence. As an example, for each finger position indexed i in the coordinate vector, the Smart Finger system computes a path tangent vector PTV at the corresponding index. The path tangent vector PTV may be defined as provided by expression (5):

$$PTV = \frac{[x(i+1) - x(i-1) \quad y(i+1) - y(i-1)]}{norm(x(i+1) - x(i-1), y(i+1) - y(i-1))} \quad (5)$$

where x and y denotes the X/Y coordinates, and norm denotes a normalization function. In one embodiment, the normalization function of expression (5), namely norm(x(i+1)−x(i−1), y(i+1)−y(i−1)), may be replaced with another exemplary denominator fraction as a divisor, such as $\sqrt{(x(i+1)-x(i-1))^2 + (y(i+1)-y(i-1))^2}$.

Also, for each finger position, the Smart Finger system finds all curves located in a predetermined range or threshold around the position at index i. This operation can be performed by computing a distance between the point at index i and each curve in the AGDB. If this distance is less than the predetermined threshold or within the predetermined range, the curve is within an acceptable range of the finger point. Optionally, this operation can be performed using a quad tree algorithm to improve curve search performances.

For each curve found, the Smart Finger system computes the tangent vector at a middle point of the curve. Optionally, other suitable locations on the curve can be used in computing the tangent vector to suit different applications. If an absolute value of dot product of this tangent vector and a previously computed path tangent vector at index i is greater than a predetermined threshold, and if the curve is associated to a link that is associated to an element, then the Smart Finger system saves the element identifier in memory for later use. However, the Smart Finger system removes duplicate element identifiers. A tuning or calibration of the predetermined threshold can be performed manually or automatically to achieve desired results.

During this operation, if only one element identifier is found, and if this identifier has not yet been found for another index k, then the Smart Finger system adds or consolidates this element identifier to the recognized clearance sequence. At the end of the algorithm for each finger position, the Smart Finger system has computed the set of successive element identifiers that represents the recognized taxi clearance sequence. In certain embodiments, this consolidated taxi clearance sequence may be used in conjunction with other user input devices, such as a keyboard, or an individual element selection method as described above in relation to FIGS. 14-21, for computing and displaying the taxi route.

Then, in this example, the Smart Finger system highlights finalized elements W50, W40, W30, W20, S2, M2, and N2 on the digital map in a second color, e.g., green, for confirmation. For example, the color change into green occurs only once after the confirmation of the entire taxi clearance by the user. As a result, this raw drawing method reduces taxi operation time and costs due to its speedy input method and interaction with the airport database, such as the AGDB and the ARINC 816 databases.

Returning now to FIG. 2, in step 400, the present taxiing path optimization system 10 defines or determines a current aircraft position. Optionally, step 400 can be performed before or in parallel with step 200. Further, step 400 can be performed at an on-ground system, such as the ATC Ground Control system. The present taxiing path optimization system 10 determines an ownship position by consolidating additional data from other sources for preventing an inaccurate display of the aircraft and airport elements on the digital map. In one embodiment, the additional data include airport databases, such as the ARINC 816 databases and AGDB.

An ownship symbol is displayed on a presumed centerline of the runway or taxiway on which the aircraft is currently traveling. In one embodiment, the ownship symbol is displayed with a fixed uncertainty ring in accordance with a precision of the GNSS receiver. Similarly, other surrounding aircraft and airport element symbols are presumably displayed on the centerlines of the corresponding runways and taxiways. A consolidated position of the aircraft is determined based on positional information received from the airport databases. The consolidated position of the aircraft is displayed on the on-board display, such as an electronic map showing the ownship symbol and other aircraft symbols.

In one embodiment, the present system 10 identifies an existing taxi route (e.g., a computed taxi route) to improve the consolidation of aircraft position and aircraft heading parameter for providing aircraft heading information. Preferably, the present system 10 uses the AGDB as the flow graph database of the airport, having access to raw aircraft positions, for computing a consolidated aircraft position. In one embodiment, the present system 10 performs five steps to compute the consolidated aircraft position. For example, in the first step, the present system 10 finds all curves located within a predetermined range around the aircraft position. This can be achieved by computing a distance between the aircraft position and each curve in the AGDB. If the distance is less than a predetermined threshold, the curve is determined to be within the range of the aircraft. Other suitable algorithms, such as a quad tree algorithm, are used to improve the curve search performances.

In the second step, if no such curve is found, the present system 10 stops the consolidation computation, and outputs the raw aircraft position or heading parameter, or provides no output data. In the third step, if at least one such curve is found, the present system 10 computes a penalty value for each curve found. In the fourth step, the present system 10 selects a curve having the lowest penalty value. In the fifth step, the present system 10 computes the consolidated aircraft position and heading parameter based on the selected curve.

The penalty value is determined based on a combination of several predetermined criteria. For example, the penalty value is computed based on a distance d between the aircraft position and an orthogonal projection of the aircraft position on the corresponding curve, and an angular deviation $\psi$ between the aircraft heading and the tangent vector of the corresponding curve at the projection of the aircraft position on the corresponding curve. For example only, an exemplary penalty value P may be defined as provided by expression (6):

$$P = k_d d + k_\psi \psi + \delta k_{route} \tag{6}$$

where $\delta=0$ if the curve is part of the current taxi route, and 1 otherwise. $k_d$, $k_\psi$, $k_{route}$ denote coefficients having weighting factors used to give predetermined weights (e.g., for different effects) of each term of the penalty computation.

Figure 22:
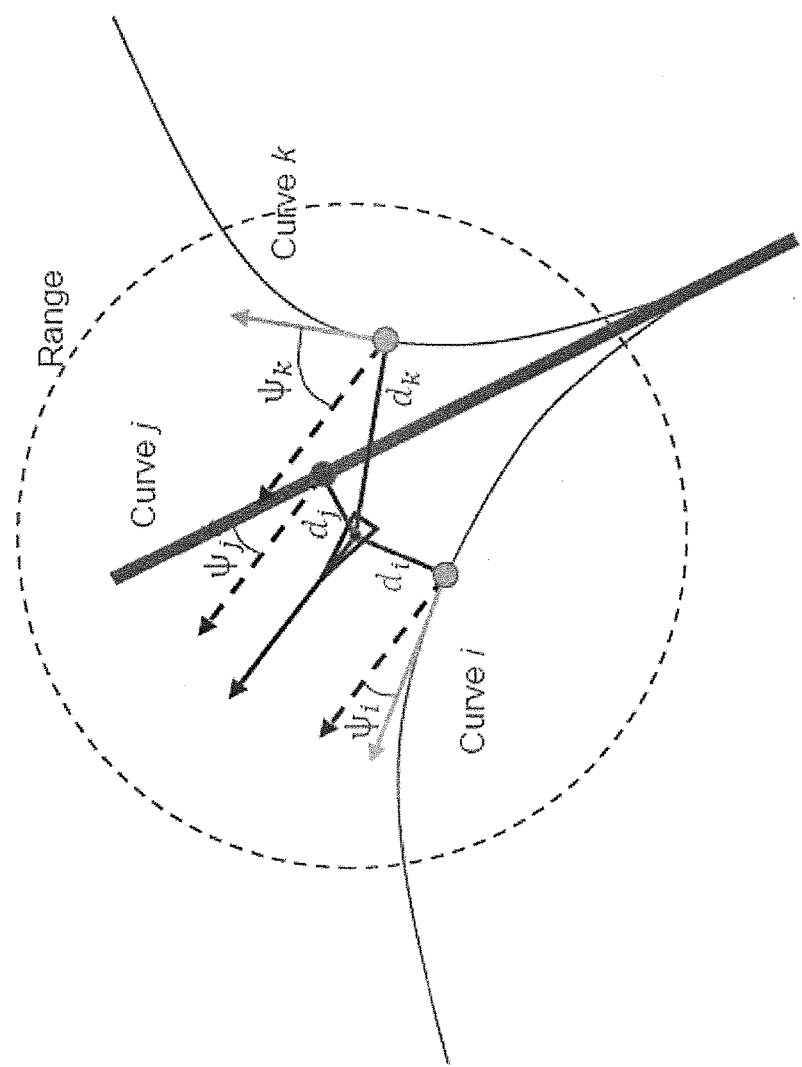
FIGS. 22-24 illustrate an exemplary method of determining a consolidated aircraft position using a five-step method of the present taxiing path optimization system.

Referring now to FIG. 22, an exemplary method of determining a consolidated aircraft position is illustrated using the five steps described above. For example, the present system 10 finds three curves Curve i, Curve j, and Curve k within the predetermined range Range around the aircraft indicated by a triangle A. The present system 10 computes three distances, $d_i$, $d_j$, and $d_k$ between the aircraft position and the orthogonal projection of the aircraft position on each found curve. A computational method of the projection of a point on a curve depends on a type of the curve, and can be performed as known in the mathematics art. The present system 10 computes three angular deviations $\Psi_i$, $\Psi_j$, and $\Psi_k$ using any computational method known in the art.

Next, the present system 10 selects one of three curves Curve i, Curve j, and Curve k, based on the $k_d$, $k_\psi$, and $k_{route}$ values. The $k_d$, $k_\psi$, and $k_{route}$ values may be empirically tuned (e.g., by giving similar weights of d, psi, and delta) for achieving a desired consolidation aircraft position. In this example, the Curve j may have the lowest penalty value than the Curve i and Curve k because the Curve j is part of the current taxi route. The present system 10 selects the Curve j as the consolidated aircraft position and heading parameter, which is indicated by an arrow in red.

Figure 23:
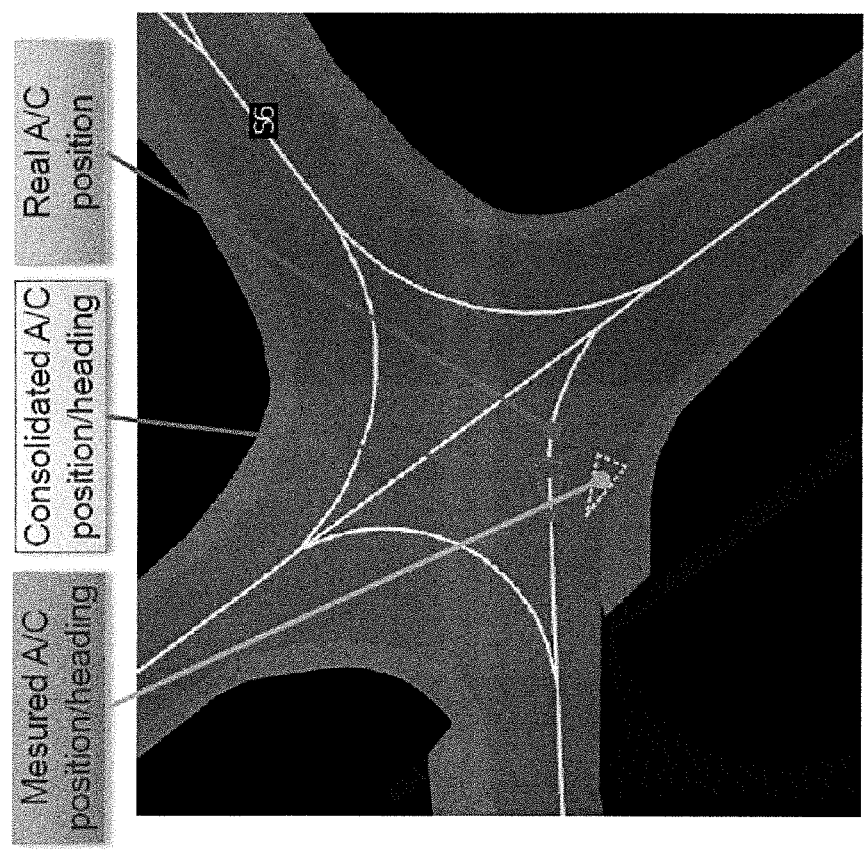

Referring now to FIG. 23, if the present system 10 does not find any taxi route near the aircraft, the most likely consolidated aircraft position is computed based on a network of curves from the AGDB. Similarly, the aircraft heading is also consolidated based on the network of curves from the AGDB.

Figure 24:
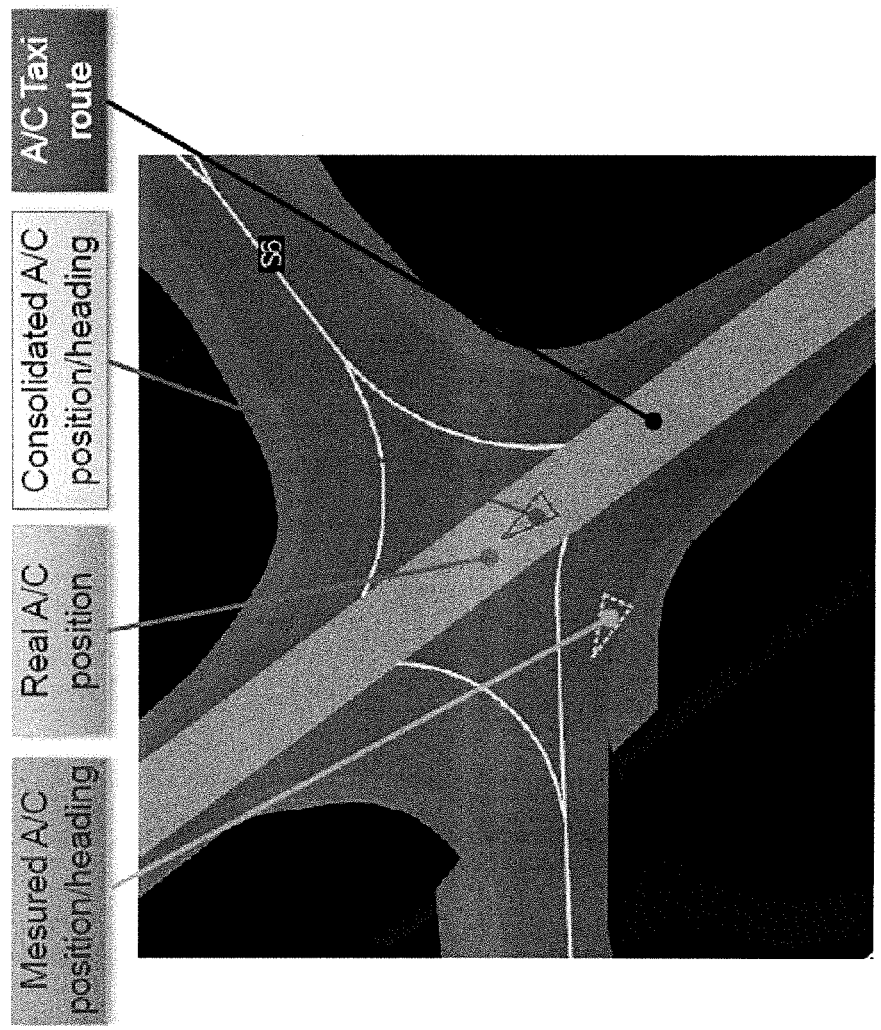

Referring now to FIG. 24, if the present system 10 finds a taxi route near the aircraft, the present system improves the consolidation of the aircraft position and heading based on the network of curves. Thus, a result of the consolidation can be different according to whether a nearby trajectory is absent (FIG. 23) or present (FIG. 24). Although a real position of the aircraft is unknown to the present system, a measured position is available based on the signals received from the dedicated sensors and navigation systems. A consolidated position of the aircraft represents an improved measured position of the aircraft based on the AGDB data.

In another embodiment, the present system 10 identifies an aircraft ground speed parameter (if available) to temporarily compute the consolidated aircraft position or aircraft heading parameter even if measured aircraft position or aircraft heading parameter are unavailable. As an example, the aircraft position is determined based on the latitude/longitude values in the WGS84 reference system. Also, the heading parameter denotes the heading of the aircraft. Theses parameters are measured, for instance, by the IRS and GNSS sensors.

When the aircraft ground speed is known, the present system 10 uses the ground speed of the aircraft to estimate the aircraft position and heading parameters in case of temporary unavailability of the heading parameters. In some cases, these parameters may become unavailable due to unavailable GNSS signals or excessive drift of the IRS position.

For example, if the X/Y coordinate vector in map coordinates is used, and $X_a$, $Y_a$, and $\Psi_a$ denote the last available measurements of the aircraft position and heading, the present system 10 computes an estimation of the aircraft position and heading using the following equation (7):

$$\begin{cases} X = X_a + V \cdot t \cdot \cos\psi_a \\ Y = Y_a + V \cdot t \cdot \sin\psi_a \end{cases} \quad (7)$$

where V is the aircraft current ground speed, and t is the time elapsed since the measurements were unavailable.

Thus, if a taxi route is available as shown in FIG. 24, the present system 10 may use the taxi route to improve the quality of the estimation. For example, the present system 10 estimates the aircraft position and heading based on assumption that the aircraft has travelled a distance equal to V·t along the taxi route from a last known aircraft position.

This method enables the present system 10 to temporarily (e.g., several seconds) compute the consolidated position and heading parameter even if the measured position and heading parameter are unavailable. If the aircraft position and heading measurements are still unavailable after a predetermined period, the present system 10 stops the estimation process as the estimation results may diverge from true aircraft position and heading parameter. As such, this method provides an enhanced continuity of service to the flight crew in case of temporary loss of the GNSS signal. In one embodiment, parameters giving the quality of the received signal inside the GNSS receiver can also be used to remove the ownship symbol in case of a significant deviation. Exemplary parameters include HDOP (Horizontal Dilution of Precision) and HIL (Horizontal Integrity Limit) parameters. Returning now to FIG. 2, in step 500, the present taxiing path optimization system 10 generates or computes a taxi route based on an inputted taxi clearance. The inputted taxi clearance does not have to be complete or continuous because the present system 10 completes automatically the missing clearance elements as needed. For example, the present system 10 indicates to the flight crew that the present system has automatically inserted missing clearance elements during a taxi route computation or generation phase such that the crew can take an appropriate action, such as to accept, confirm, or validate the inserted elements, reject the inserted elements, or modify the taxi clearance.

The present system 10 identifies aircraft capabilities, such as the ACN, PCN, maximum turning radius and maximum wingspan, for preventing from generating or selecting taxi routes that are incompatible with aircraft characteristics, and generates a warning signal (such as a coding color) or message for the flight crew when such incompatibilities are found in any taxi routes, such as an initial inputted taxi clearance, or a finalized or computed taxi clearance. Further, the present system 10 suggests the flight crew different taxi route alternatives when the taxi clearance is ambiguous, such that the crew can selectively choose one of the alternatives.

These computed taxi routes are designed to support other related systems, such as the on-ground guidance system for the aircraft, and ensure data accuracy and integrity using airport flow graph databases, such as the AGDB and ARINC 816 databases. The present system 10 may simply display the taxi route on the digital map using suitable geo-referenced background charts, synthetic view, or satellite images. As discussed above, the taxi clearance may be entered into the present system 10 using a keyboard, a datalink, or other suitable electronic devices known in the art.

Figure 25:
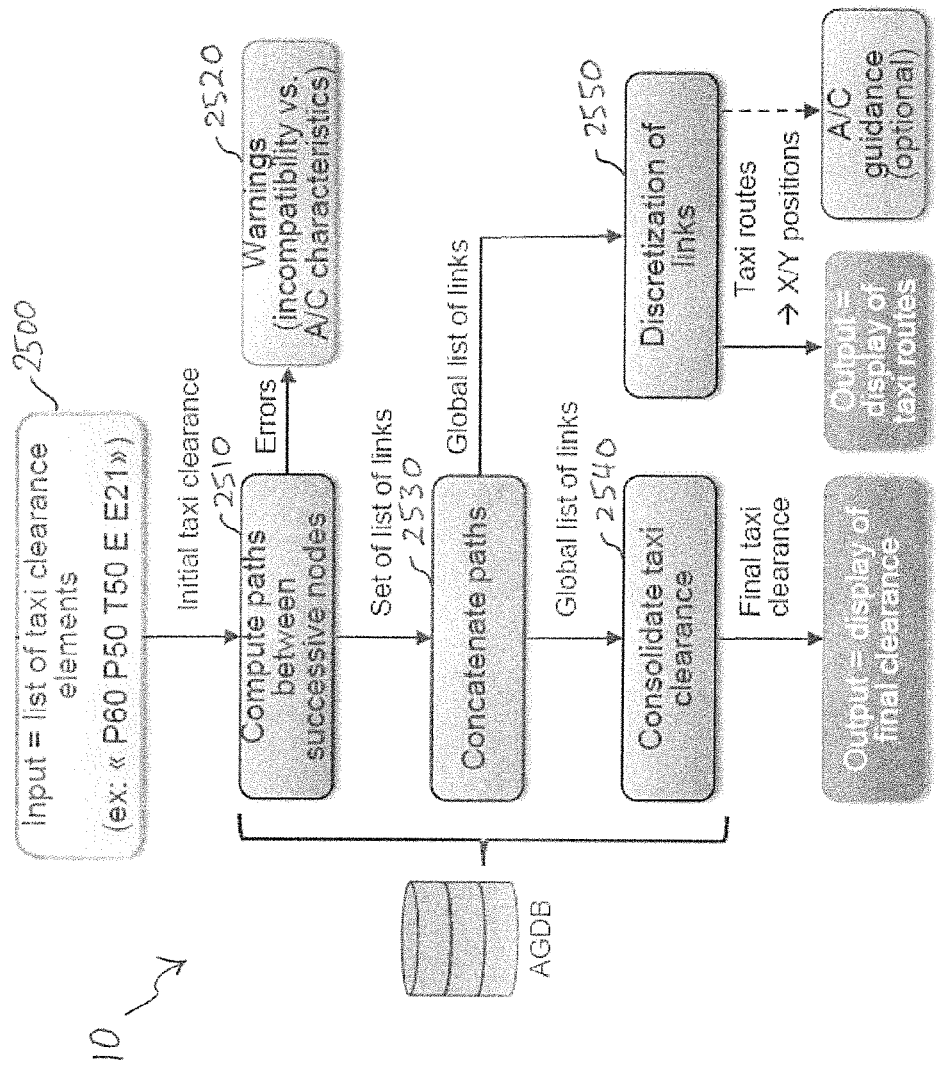
FIG. 25 is a flow chart of computing or generating a final taxi clearance and corresponding taxi routes using the present taxiing path optimization system.

Referring now to FIG. 25, an exemplary method of computing or generating a final taxi clearance and corresponding taxi routes is illustrated using the present AGDB and the present system 10. Although the following steps are primarily described with respect to the embodiments of FIG. 2 and other related methods, it should be understood that the steps within the method may be modified and executed in a different order or sequence without altering the principles of the present disclosure.

The method begins at step 2500. In step 2500, an initial taxi clearance having a list of taxi clearance elements is inputted by a user or received by the present system 10, which contains element names (e.g., <<P60 P50 T50 E E21>>) or identifiers (e.g., <<105 925 32 412 223>>). In step 2510, the present system 10 searches for a path or link between successive pairs of nodes using an algorithm known in the art, such as Dijkstra or A* algorithms. A continuous set of links is generated connecting from one node to the next node. The path or link found is computed for minimizing a predetermined set of criteria, e.g., for minimizing the length of the path.

Other criteria include minimizing the risks associated with the aircraft characteristics and the airport capabilities, such as the ACN, PCN, and maximum wingspan. It is contemplated that the present system 10 searches for a path with the smallest taxi route length or the smallest time to travel through the taxi route, or the smallest number of airport elements. As a result, a set of lists of links is generated (i.e., one list of links for each pair of nodes). Preferably, the taxi clearance input does not need to be continuous. Thus, when there are gaps between two successive elements in the clearance, the gaps are automatically filled by the present system 10 while finding the path between the elements.

Figure 26:
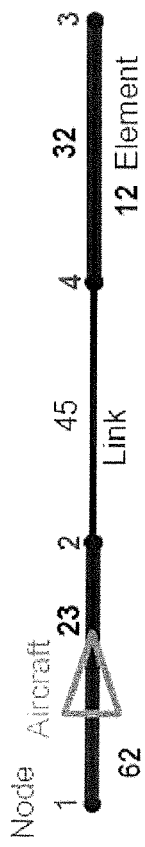
FIGS. 26 and 27 illustrate an exemplary method of searching for a path between successive pairs of nodes using the present taxiing path optimization system.
Figure 27:
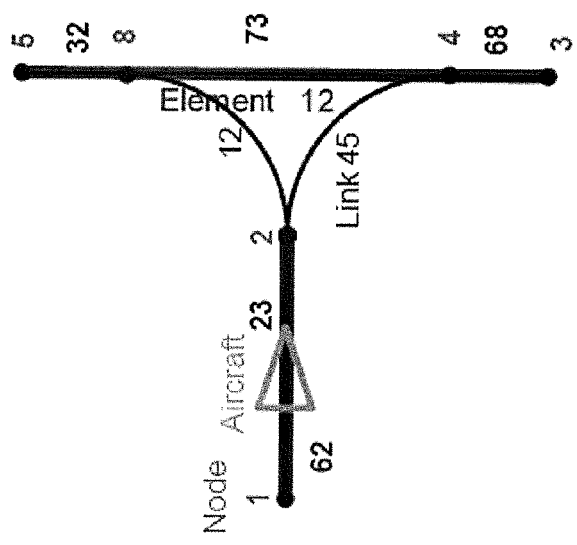

Referring now to FIGS. 26 and 27, an exemplary method of searching for a path between successive pairs of nodes is illustrated. In this example, the present system 10 identifies a first or current node in the list of links, which may be a departure gate node (e.g., taxi-out), or a threshold of a current runway (e.g., taxi-in). Generally, if the aircraft is traveling on a taxiway in the airport, the present system 10 chooses an extreme node (e.g., a beginning or ending node) of the airport element behind the aircraft. If the aircraft position and heading are unknown, the present system 10 chooses an arbitrary extreme node.

From this first or current node, for each element of the taxi clearance, the present system 10 computes a first route from the current node to a first node of the next element. If the first route has a last node of the next element, the last node is selected as the current node at a next iteration. Otherwise, the present system 10 computes a second route from the current node to the last node of the next element. If the second route has the first node of the next element, the first node is selected as the current node at the next iteration. Otherwise, there is an ambiguity. As discussed above, the first and last nodes are defined by the nodes list of the corresponding element.

As an example, in FIG. 27, each of two elements designated 62 and 12 has one or more links. Specifically, the element 62 is composed of the link 23, but the element 12 is composed of links 32, 73, and 68. As the aircraft heading and position are known in this example, the present system 10 selects node 1 as the first node. Then, the present system 10 computes a first route from node 1 to node 3 (i.e., the first node of element 12). The resulting first route includes links 23-45-68 having node 3 as the last node of element 12. Thus, node 4 becomes the current node as a new starting node for the next iteration.

Next, the present system 10 computes a second route from node 1 to node 5, because the node 5 is not included in the first computed route, causing the ambiguity of the clearance. Thus, both first and second routes are computed and displayed, but there exists a bifurcation point (node 2). The present system 10 selects a last common node of both taxi routes as the current node at the next iteration, which is the node at which both compute taxi routes bifurcate.

As an example, in FIG. 27, the present system 10 searches for a path from node 1 to node 5, then to node 3. The present system 10 selects node 2 as the current node for the next iteration, which is the last common node for both routes having links 12, 45. For the last element of the taxi clearance, if two taxi routes are available, the present system 10 displays both routes to indicate the ambiguity to the flight crew.

Returning now to FIG. 25, in step 2520, the present system 10 examines whether each link is compatible with the aircraft characteristics. For example, the present system 10 checks if the ACN is smaller than the link PCN, or checks if the aircraft wingspan is smaller than the link maximum wingspan. When incompatibilities are found, the present system 10 generates a warning signal or message for the flight crew, or avoids the link during the search so that the final path does not include this link.

In step 2530, the present system 10 concatenates the successive set of continuous links into a single list of successive links, from the departure point to the destination point through possible or eligible waypoints. Specifically, the present system 10 computes a list of successive elements associated with the single list of successive links based on the initial taxi clearance. The present system 10 differentiates the elements inputted by the flight crew from the elements automatically generated by the present system for filling in the gaps between unconnected airport elements (e.g., color-coded differently).

Figure 32:

In step 2540, the present system 10 consolidates the inputted elements with the generated elements, and displays the consolidated taxi clearance without the gaps. An exemplary display of the consolidated taxi clearance is illustrated in FIGS. 28 and 32.

Figure 28:
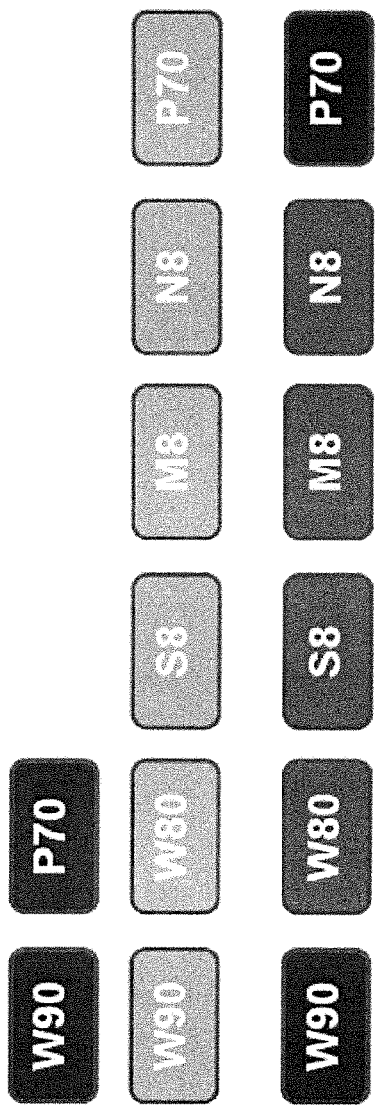
FIG. 28 illustrates an exemplary method of displaying a taxi clearance sequence on a display using different colors.

Referring now to FIG. 28, a first row represents the initial clearance elements W90, P70 inputted by the flight crew. A second row represents the computed clearance sequence having the automatically generated elements W80, S8, M8, N8 for filling in the gaps between the initial clearance elements W90, P70. A third row represents the displayed clearance sequence having the initial clearance elements color-coded in a first color (e.g., magenta), and the automatically generated elements in a second color (e.g., blue).

Returning now to FIG. 25, in step 2550, the present system 10 discretizes the list of links into X/Y points. A list of X/Y points constitutes a final taxi route representation, and may be displayed on the digital map. It is also contemplated that the list of points are used for other applications, such as the aircraft guidance applications. The present system 10 converts each link into a set of curves, which are the geometrical duals of the links.

Figure 29:
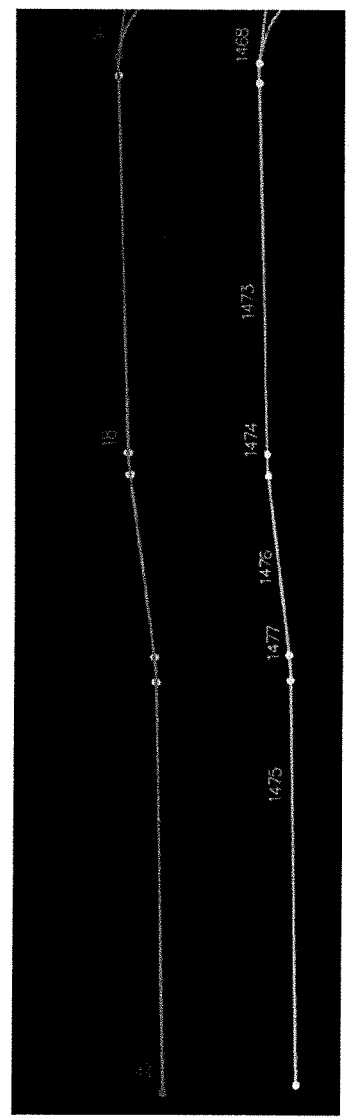
FIG. 29 illustrates an exemplary Bézier curve having discretized links.

Referring now to FIG. 29, as an example, link 18 has curves 1475, 1477, 1476, 1474, 1473, and 1468. Each $3^{rd}$ order Bézier curve is approximated to be a succession of segments using any approximation technique known in the art. Further, an empirical tuning can be performed for selecting an acceptable value. As an example of the empirical tuning, a first tuning is performed to have a smooth display of turns. An exemplary acceptable value for the first tuning is 30. A second tuning is performed to display performances (but poor smoothness). An exemplary acceptable value for the second tuning is 10.

Figure 30:
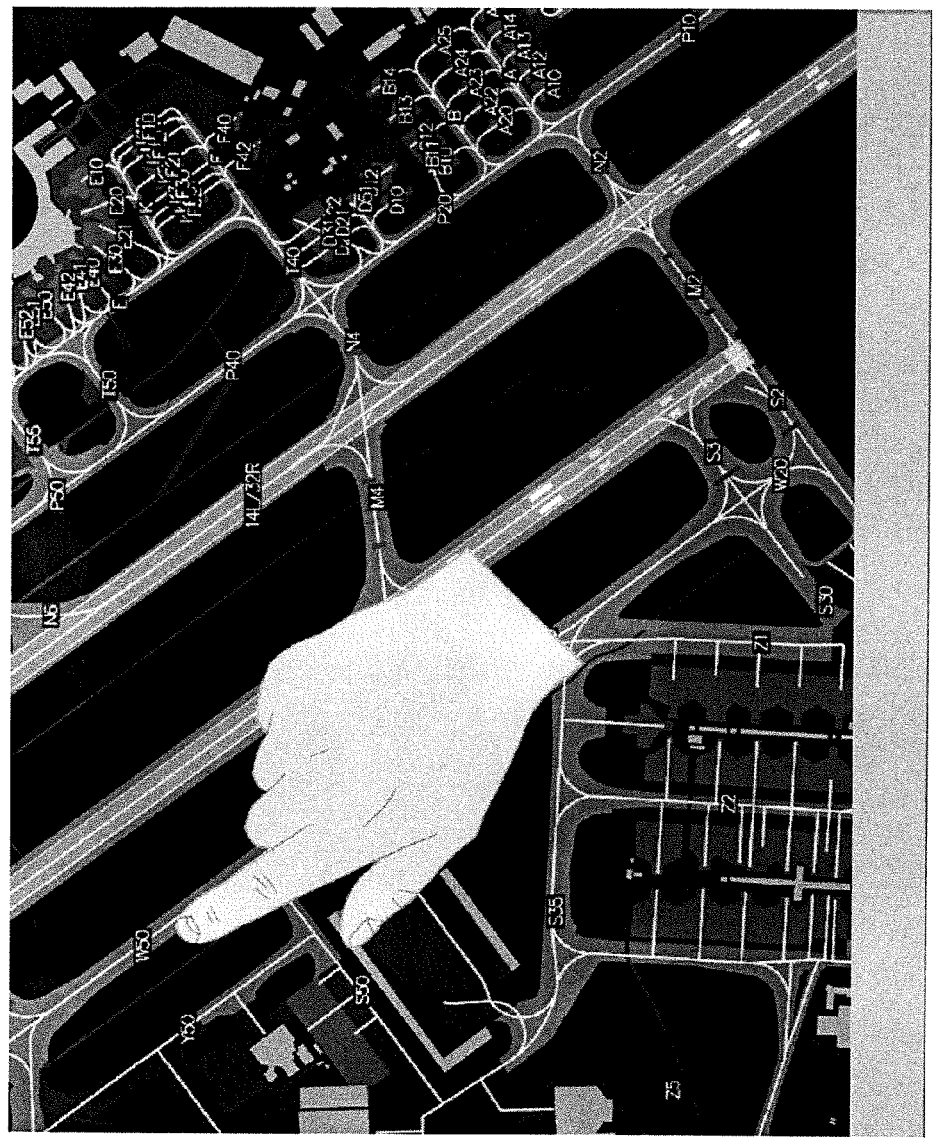
FIGS. 30-32 illustrate an exemplary taxi clearance input method using the Smart Finger system of the present taxiing path optimization system, featuring an automatic fulfillment of the gaps between elements.
Figure 31:
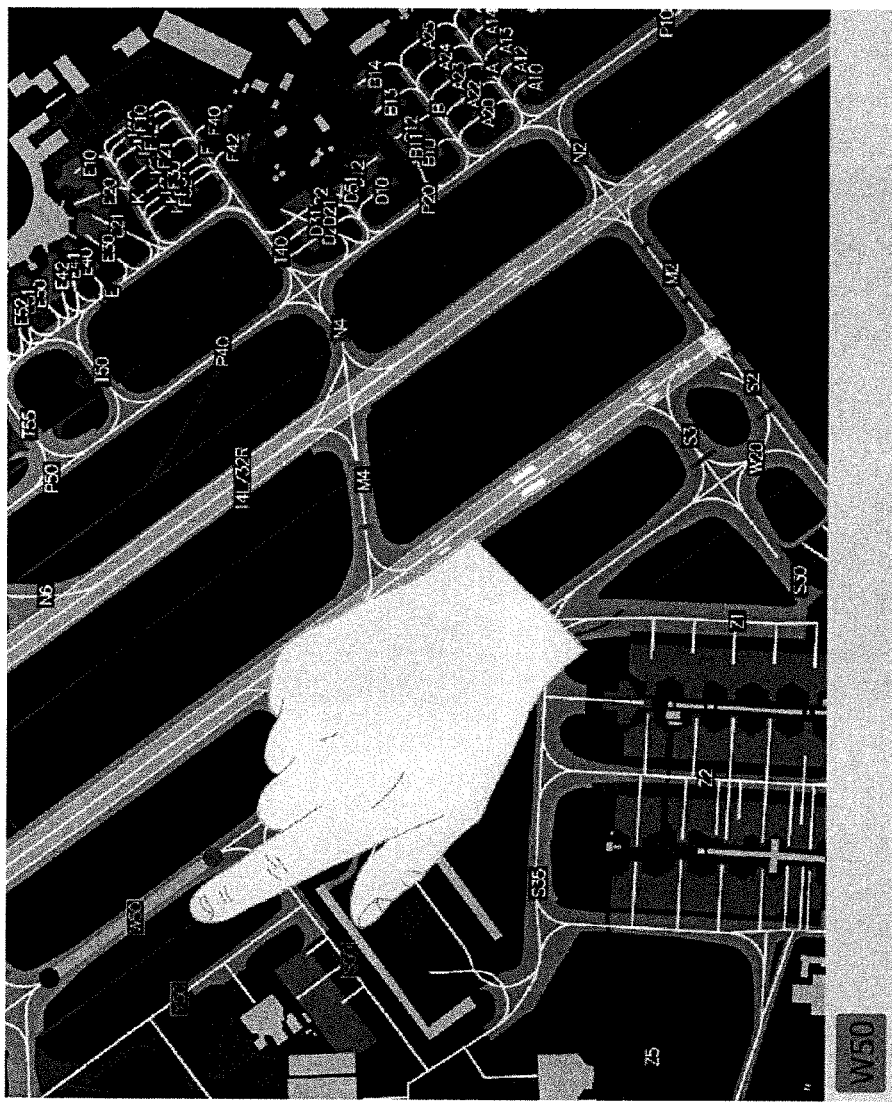

Referring now to FIGS. 30-35, an exemplary taxi clearance input method is illustrated using the Smart Finger system. More specifically, FIGS. 30-32 show an exemplary method of displaying the consolidated taxi clearance. FIG. 30 shows an empty clearance sequence on the command line disposed at a bottom of the display. FIG. 31 shows that a clearance element W50 is entered by directly clicking on the element W50 using a fingertip of the flight crew. The first element of taxi clearance is displayed on the command line. FIG. 32 shows that the next element S2 is selected and entered by the flight crew as a second clearance element. As discussed above, the present system 10 consolidates the inputted elements W50 and S2 with the generated elements W40, W30, W20, and displays the consolidated taxi clearance without the gaps. All missing clearance elements are automatically inserted by the present system 10.

Figure 33:
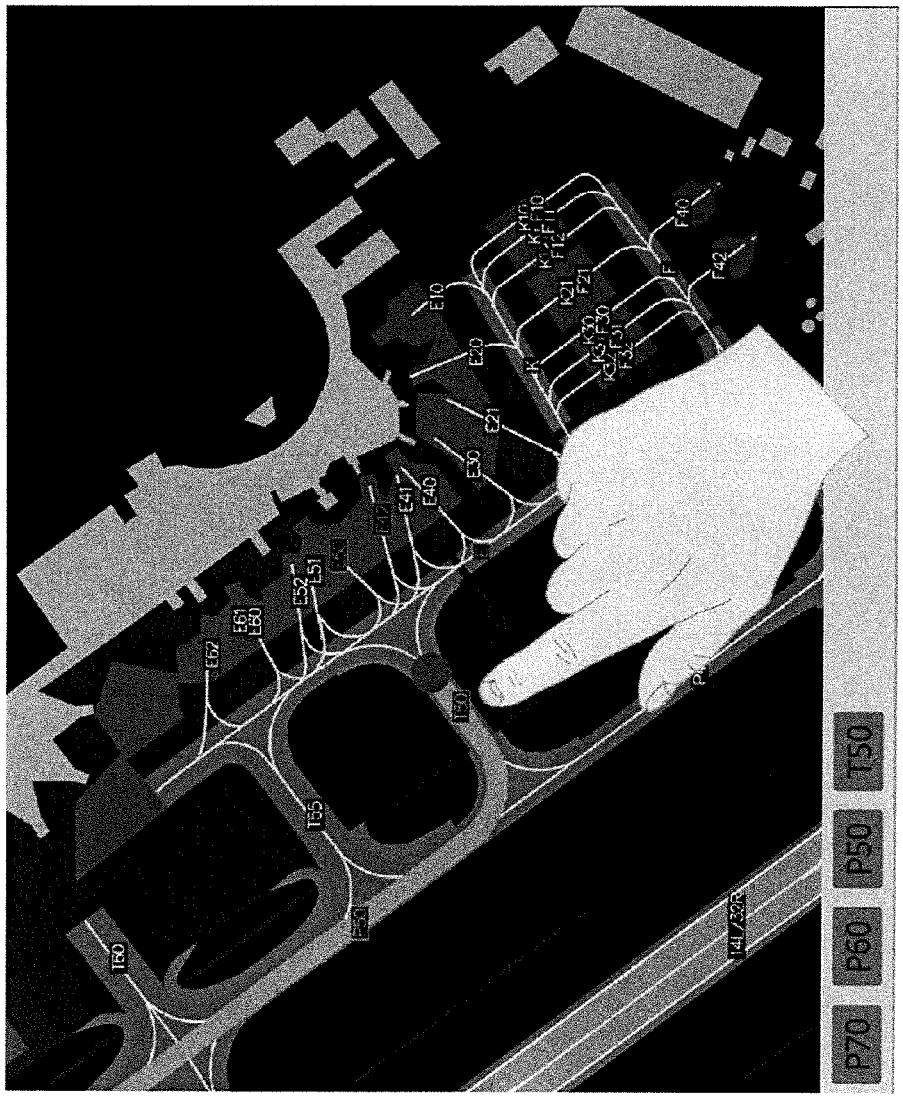
FIGS. 33-35 illustrate an exemplary method of displaying multiple possible taxing paths when the inputted taxi clearance is ambiguous using the present taxiing path optimization system.
Figure 34:
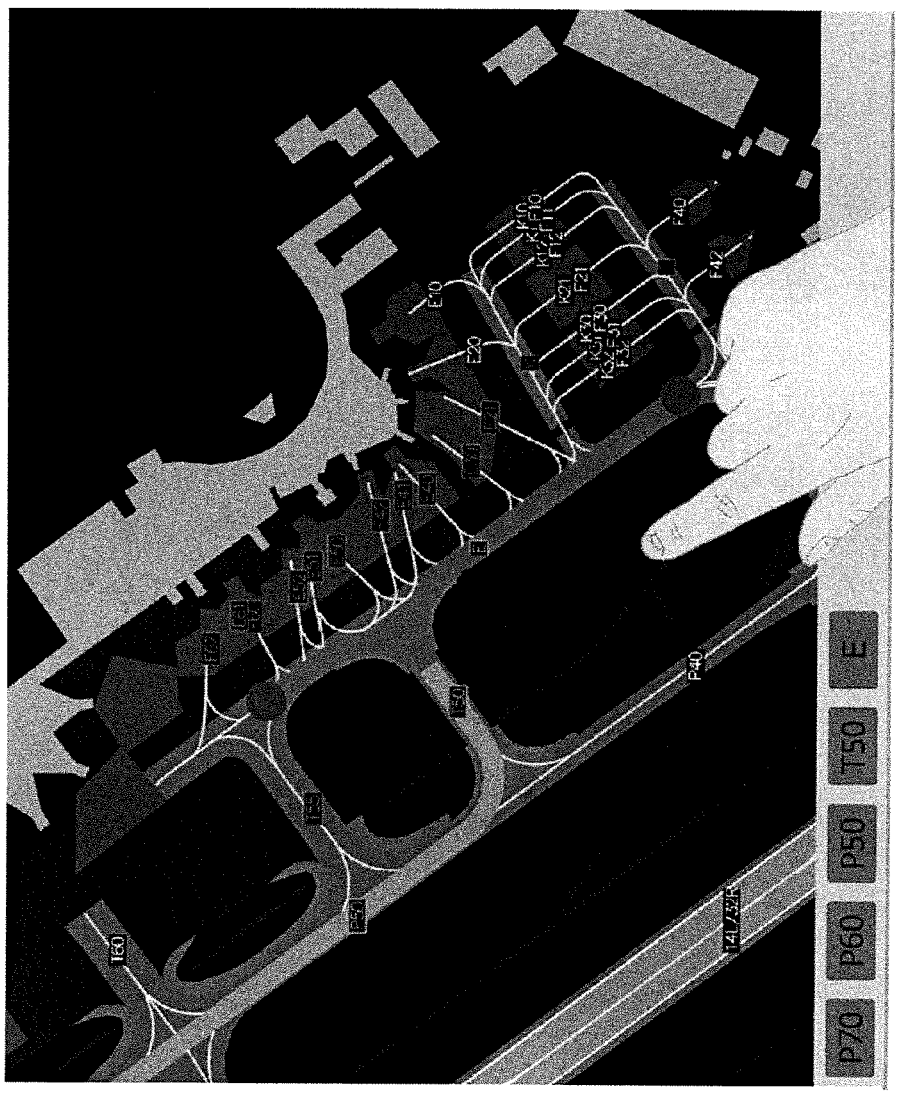
Figure 35:
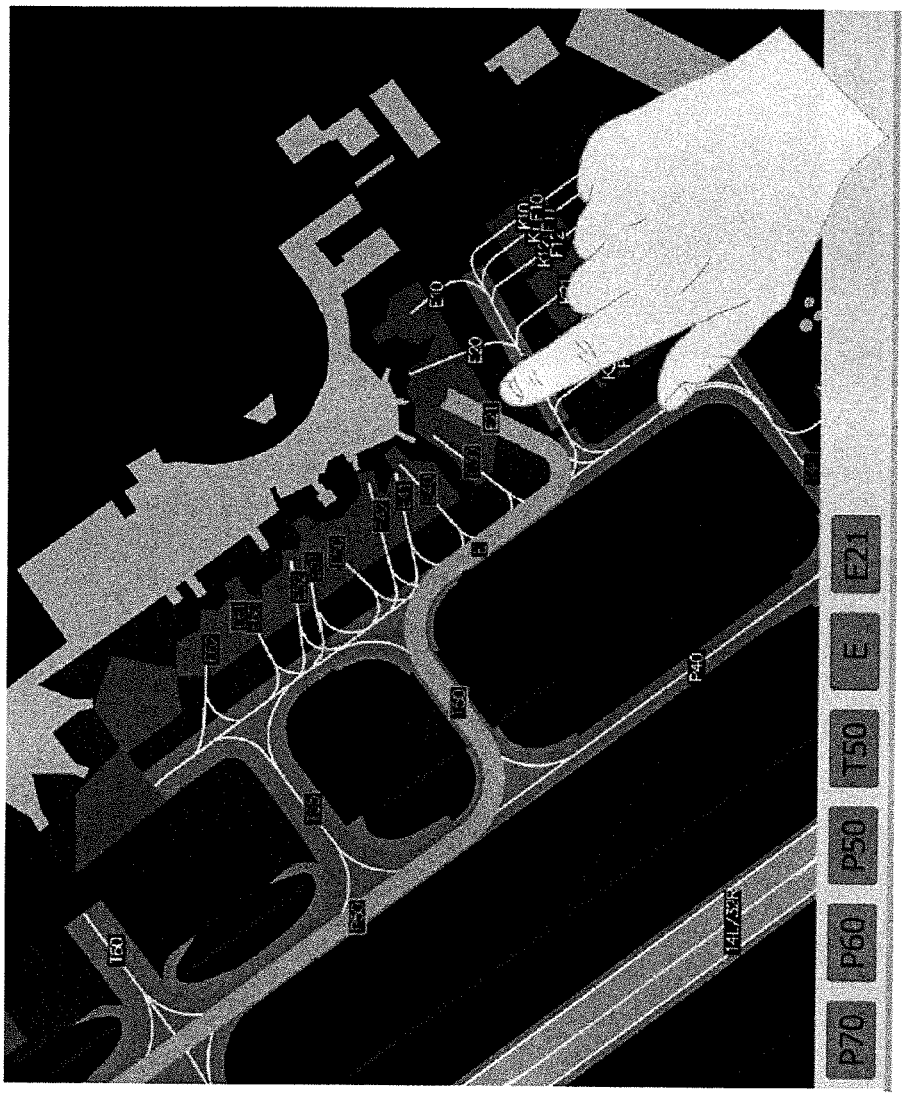

FIGS. 33-35 illustrate an exemplary method of resolving an ambiguous taxi clearance in the present system 10 using the Smart Finger system. FIG. 33 shows that an element T50 is entered or selected by the flight crew in addition to a previously selected element P50, both of which are highlighted for identification. In this example, the clearance elements include P70, P60, P50, and T50 as displayed in the command line at the bottom of the display. The clearance element T50 appears at an end of the consolidated clearance sequence P70, P60, P50, T50. FIG. 34 shows that a next element E is selected or entered by the flight crew. However, from the element T50, the taxi route is bifurcated to the left side and the right side relative to the element T50, thereby creating the ambiguity. The present system 10 proposes these two possible taxi routes to the flight crew, and the ambiguity is resolved by the next element chosen by the flight crew. For example, as shown in FIG. 35, the crew selects or enters the next element E21 (e.g., a parking stand) to resolve the ambiguity. As a result, the final taxi clearance is established as a set of elements P70, P60, P50, T50, E, and E21.

While preferred embodiments of the disclosure have been herein illustrated and described, it is to be appreciated that certain changes, rearrangements and modifications may be made therein without departing from the scope of the disclosure.

What is claimed is:

1. A taxiing path optimization system for computing a taxi path of an aircraft using available taxi routes of a corresponding airport, the taxiing path optimization system comprising:
    an interaction management unit that manages, using a computer processor executing computer-readable instructions, interactions between a user and the taxiing path optimization system using an interactive device configured for inputting a taxi clearance;
    an aircraft positioning management unit that determines, using the computer processor, positional information of the corresponding airport and aircraft received from a plurality of sources for augmenting an aircraft position by consolidating the aircraft position with the positional information in a complementary fashion, the aircraft positioning management unit including at least one of: a built-in positioning system, an internal positional sensor, and an external positional sensor; and
    a taxi path display unit that displays, using the computer processor, the taxi path based on the inputted taxi clearance and the augmented aircraft position, wherein the taxi path is automatically computed by the taxiing path optimization system based on compatibility associated with the taxi path in at least one of: an aircraft characteristic and an airport capability with respect to the aircraft characteristic.

2. The system of claim 1, wherein the aircraft positioning management unit interfaces with a wireless communication facility, and performs a geo-localization for determining the aircraft position.

3. The system of claim 1, wherein the taxi path display unit provides a plurality of levels of display options for displaying the taxi path based on the aircraft position and the positional information.

4. The system of claim 1, wherein the taxiing path optimization system generates a warning signal or message for the user when at least one of the aircraft characteristics is incompatible with the taxi path.

5. The system of claim 1, further comprising a database configured for describing a flow graph of the airport, and representing a description of all potential taxi ground trajectories or routes using a geo-referenced geometrical description and a logical description.

6. The system of claim 5, wherein the flow graph includes nodes, links connecting the nodes, and airport elements for defining the taxi routes.

7. The system of claim 1, wherein the taxiing path optimization system is configured for automatically filling in a gap between unconnected elements in the taxi clearance.

8. The system of claim 1, wherein the taxiing path optimization system proposes possible taxi routes to the user when there is an ambiguity in the computed taxi path.

9. The system of claim 8, wherein the taxiing path optimization system provides an option for the user to select one of the possible taxi routes to resolve the ambiguity.

* * * * *